US012043027B2

(12) United States Patent
Umezawa et al.

(10) Patent No.: US 12,043,027 B2
(45) Date of Patent: Jul. 23, 2024

(54) PRINTING APPARATUS AND INSPECTION METHOD THEREFOR

(71) Applicant: CANON KABUSHIKI KAISHA, Tokyo (JP)

(72) Inventors: Masahiko Umezawa, Kawasaki (JP); Kouichi Serizawa, Yokohama (JP); Satoshi Kitai, Kawasaki (JP); Yoshiaki Murayama, Tokyo (JP); Takeshi Murase, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 188 days.

(21) Appl. No.: 17/492,303

(22) Filed: Oct. 1, 2021

(65) Prior Publication Data

US 2022/0016882 A1 Jan. 20, 2022

Related U.S. Application Data

(63) Continuation of application No. 16/533,862, filed on Aug. 7, 2019, now Pat. No. 11,155,078.

(30) Foreign Application Priority Data

Aug. 7, 2018 (JP) ................................ 2018-148717

(51) Int. Cl.
*B41J 2/165* (2006.01)
*B41J 2/005* (2006.01)
*B41J 2/045* (2006.01)

(52) U.S. Cl.
CPC ........... *B41J 2/0451* (2013.01); *B41J 2/0057* (2013.01)

(58) Field of Classification Search
CPC ...... B41J 2/165; B41J 2/16579; B41J 2/2114; B41J 2/0451; B41J 2/2142; B41J 2/0458; B41J 2002/14354
See application file for complete search history.

(56) References Cited

U.S. PATENT DOCUMENTS 8,083,337 B2 12/2011 Takekoshi et al.
8,186,798 B2 5/2012 Aoki et al.
(Continued)

FOREIGN PATENT DOCUMENTS

CN 101391518 A 3/2009
CN 103057276 A 4/2013
(Continued)

OTHER PUBLICATIONS

Extended European Search Report dated Dec. 19, 2019, in European Patent Application No. 19190468.9.
(Continued)

*Primary Examiner* — Scott A Richmond
(74) *Attorney, Agent, or Firm* — Venable LLP

(57) ABSTRACT

A printing apparatus prints by discharging ink to a transfer member from a first printhead, discharging a transfer accelerator to the ink from a second printhead, and transferring an image formed on the transfer member to a print medium. When inspecting a discharge state of each of plural nozzles provided in each of the first and second printheads, the apparatus controls the second printhead so as to discharge the transfer accelerator from at least one nozzle of the second printhead to a discharge area of the transfer member to which the ink is discharged by the first printhead for inspection of the discharge states of the plural nozzles of the first printhead, while inspecting a discharge state of a nozzle different from the at least one nozzle of the second printhead by discharging the transfer accelerator from the nozzle.

30 Claims, 20 Drawing Sheets

(56) References Cited

U.S. PATENT DOCUMENTS

| | | | | |
|---|---|---|---|---|
| 8,500,269 | B2 | 8/2013 | Morita | |
| 8,845,060 | B2 | 9/2014 | Azuma et al. | |
| 9,085,188 | B2 | 7/2015 | Hasegawa | |
| 9,340,009 | B2 | 5/2016 | Murayama et al. | |
| 9,434,196 | B2 | 9/2016 | Fukasawa et al. | |
| 9,656,465 | B2 | 5/2017 | Yokozawa et al. | |
| 10,293,620 | B2 | 5/2019 | Murayama et al. | |
| 11,020,959 | B2 | 6/2021 | Murase et al. | |
| 2007/0052745 | A1 | 3/2007 | Izuo | |
| 2007/0070108 | A1 | 3/2007 | Mantell et al. | |
| 2011/0141188 | A1 * | 6/2011 | Morita | B41J 2/0057 347/20 |
| 2013/0141484 | A1 | 6/2013 | Kasai et al. | |
| 2013/0329144 | A1 * | 12/2013 | Fukasawa | B41J 2/2142 349/19 |
| 2013/0335471 | A1 | 12/2013 | Murase et al. | |
| 2014/0168312 | A1 | 6/2014 | Mizes et al. | |
| 2015/0321470 | A1 * | 11/2015 | Ike | B41J 2/0454 347/57 |
| 2017/0232770 | A1 | 8/2017 | Akiyama et al. | |
| 2018/0170051 | A1 | 6/2018 | Nomura et al. | |
| 2019/0009546 | A1 | 1/2019 | Sakamoto et al. | |
| 2019/0009594 | A1 | 1/2019 | Sakamoto et al. | |
| 2020/0384760 | A1 * | 12/2020 | Anderson | B41J 2/14153 |

FOREIGN PATENT DOCUMENTS

| | | | | |
|---|---|---|---|---|
| CN | 103568563 | A | 2/2014 | |
| CN | 105936191 | A | 9/2016 | |
| CN | 107696712 | A | 2/2018 | |
| EP | 1101619 | A1 * | 5/2001 | B41J 2/2114 |
| JP | 2001-162828 | A | 6/2001 | |
| JP | 2005-059402 | A | 3/2005 | |
| JP | 2008-000914 | A | 1/2008 | |
| JP | 2011-126101 | A | 6/2011 | |

OTHER PUBLICATIONS

Office Action dated Sep. 10, 2020, in Chinese Patent Application No. 201910726324.6.

* cited by examiner

PRINTING APPARATUS AND INSPECTION METHOD THEREFOR

BACKGROUND OF THE INVENTION

Field of the Invention

The present invention relates to a printing apparatus and a printing method, and particularly to, for example, a printing apparatus for executing printing by transferring, to a print medium, an image formed by discharging ink from a printhead to a transfer member, and a method of inspecting an ink discharge state.

Description of the Related Art

Conventionally, there is known an inkjet printing apparatus that prints an image on a print medium by discharging ink droplets from a printhead. Some of such printing apparatuses have an arrangement in which an image is formed by discharging ink from the printhead to a transfer member and the formed image is transferred from the transfer member to the print medium, thereby printing the image. For example, Japanese Patent Laid-Open No. 2011-126101 discloses an arrangement including an image forming unit using an inkjet printhead, an ink removal unit, and a transfer processing unit around a transfer member like an intermediate drum.

Furthermore, Japanese Patent Laid-Open No. 2011-126101 discloses a method of applying, to an ink image formed on the transfer member, an auxiliary liquid containing a resin for improving the transferability of an image to prevent part of the ink image from remaining on the transfer member without moving to the print medium, and then transferring the ink image applied with the auxiliary liquid to the print medium.

Japanese Patent Laid-Open No. 2008-000914 discloses a method of determining the ink discharge state of a printhead that generates heat by applying a pulse to a heater and discharges ink from a nozzle using the heat. The method described in Japanese Patent Laid-Open No. 2008-000914 monitors a change in temperature of each heater when driving each heater by applying a pulse to the heater, and determining the discharge state of each nozzle based on the presence/absence of an inflection point of the change in temperature.

To maintain satisfactory printing, it is necessary to discriminate the ink discharge state of each nozzle of the printhead, and perform print control in accordance with the discrimination result. To discriminate the ink discharge state, it is necessary to discharge ink by driving the printhead for inspection at a predetermined timing. If a printing apparatus including a transfer member performs ink discharge for inspection separately from printing of an image, ink is transferred from the transfer member to the print medium, similar to an image. Such inspection needs to be executed not only for a printhead that discharges color ink for image formation but also for a printhead that discharges a transfer accelerator for acceleration of transfer of an image.

To transfer color ink discharged for inspection from the transfer member to the print medium, it is preferable to also apply a transfer accelerator for transfer acceleration to ink discharged for inspection. However, if a printhead for a transfer accelerator discharges the transfer accelerator for transfer of color ink, it is impossible to get an opportunity to inspect the printhead for the transfer accelerator, and it may thus be impossible to accurately grasp the discharge state of the printhead that discharges the transfer accelerator.

Then, if it is impossible to accurately grasp the discharge state of the printhead that discharges the transfer accelerator, even if a failure of discharge of the transfer accelerator occurs, appropriate print control cannot be executed, satisfactory transfer of a formed image is spoiled, and thus it becomes difficult to perform high-quality image printing.

SUMMARY OF THE INVENTION

Accordingly, the present invention is conceived as a response to the above-described disadvantages of the conventional art.

For example, a printing apparatus and a printing method therefor according to this invention are capable of satisfactorily determining the discharge state of a printhead that discharges a transfer accelerator, thereby achieving high-quality image printing.

According to one aspect of the present invention, there is provided a printing apparatus for executing printing by transferring an image formed on a rotating transfer member to a print medium, comprising: a first printhead configured to form an image by discharging ink, to the transfer member, from each nozzle of a plurality of nozzle arrays each of which is formed from a plurality of nozzles and which are arranged in a direction intersecting a rotation direction of the transfer member; a second printhead provided on a downstream side of the first printhead with respect to the rotation direction of the transfer member and configured to discharge, from each nozzle of a plurality of nozzle arrays each of which is formed from a plurality of nozzles and which are arranged in the direction intersecting the rotation direction of the transfer member to the image formed on the transfer member by the ink discharged from the first printhead, a transfer accelerator that accelerates transfer of the image formed on the transfer member to the print medium; an inspection unit configured to inspect, based on predetermined inspection data, a discharge state of each of the plurality of nozzles by driving each of the plurality of nozzles provided in each of the first printhead and the second printhead; and a control unit configured to control the second printhead so as to discharge the transfer accelerator from at least one nozzle of the plurality of nozzle arrays of the second printhead to a discharge area of the transfer member to which the ink is discharged by the first printhead for inspection of the discharge states of the plurality nozzles of the first printhead by the inspection unit while inspecting a discharge state of a nozzle different from the at least one nozzle of the plurality of nozzle arrays of the second printhead by discharging the transfer accelerator from the nozzle.

According to another aspect of the present invention, there is provided an inspection method for a printing apparatus for executing printing by transferring an image formed on a rotating transfer member to a print medium, comprising: inspecting, based on predetermined inspection data, a discharge state of each of a plurality of nozzles provided in each of a first printhead and a second printhead by driving each of the plurality of nozzles, the first printhead being configured to form an image by discharging ink, to the transfer member, from each nozzle of a plurality of nozzle arrays each of which is formed from the plurality of nozzles and which are arranged in a direction intersecting a rotation direction of the transfer member, and the second printhead being provided on a downstream side of the first printhead with respect to the rotation direction of the transfer member and being configured to discharge, from each nozzle of a plurality of nozzle arrays each of which is formed from the plurality of nozzles and which are arranged in the direction intersecting the rotation direction of the transfer member to the image formed on the transfer member by the ink discharged from the first printhead, a transfer accelerator that accelerates transfer of the image formed on the transfer member to the print medium; and controlling the second printhead so as to discharge the transfer accelerator from at least one nozzle of the plurality of nozzle arrays of the second printhead to a discharge area of the transfer member to which the ink is discharged by the first printhead for inspection of the discharge states of the plurality of nozzles of the first printhead while inspecting a discharge state of a nozzle different from the at least one nozzle of the plurality of nozzle arrays of the second printhead by discharging the transfer accelerator from the nozzle.

The invention is particularly advantageous since it is possible to satisfactorily determine the discharge state of a printhead that discharges a transfer accelerator, thereby achieving high-quality image printing.

Further features of the present invention will become apparent from the following description of exemplary embodiments (with reference to the attached drawings).

DESCRIPTION OF THE EMBODIMENTS

Exemplary embodiments of the present invention will now be described in detail in accordance with the accompanying drawings. Note that in each drawing, arrows X and Y indicate horizontal directions perpendicular to each other, and an arrow Z indicates an up/down direction.

<Description of Terms>

In this specification, the terms "print" and "printing" not only include the formation of significant information such as characters and graphics, but also broadly include the formation of images, figures, patterns, and the like on a print medium, or the processing of the medium, regardless of whether they are significant or insignificant and whether they are so visualized as to be visually perceivable by humans.

Also, the term "print medium (or sheet)" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be broadly interpreted to be similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium. Note that this invention is not limited to any specific ink component, however, it is assumed that this embodiment uses water-base ink including water, resin, and pigment serving as coloring material.

Further, a "print element (or nozzle)" generically means an ink orifice or a liquid channel communicating with it, and an element for generating energy used to discharge ink, unless otherwise specified.

An element substrate for a printhead (head substrate) used below means not merely a base made of a silicon semiconductor, but an arrangement in which elements, wirings, and the like are arranged.

Further, "on the substrate" means not merely "on an element substrate", but even "the surface of the element substrate" and "inside the element substrate near the surface". In the present invention, "built-in" means not merely arranging respective elements as separate members on the base surface, but integrally forming and manufacturing respective elements on an element substrate by a semiconductor circuit manufacturing process or the like.

Printing System

Figure 1:
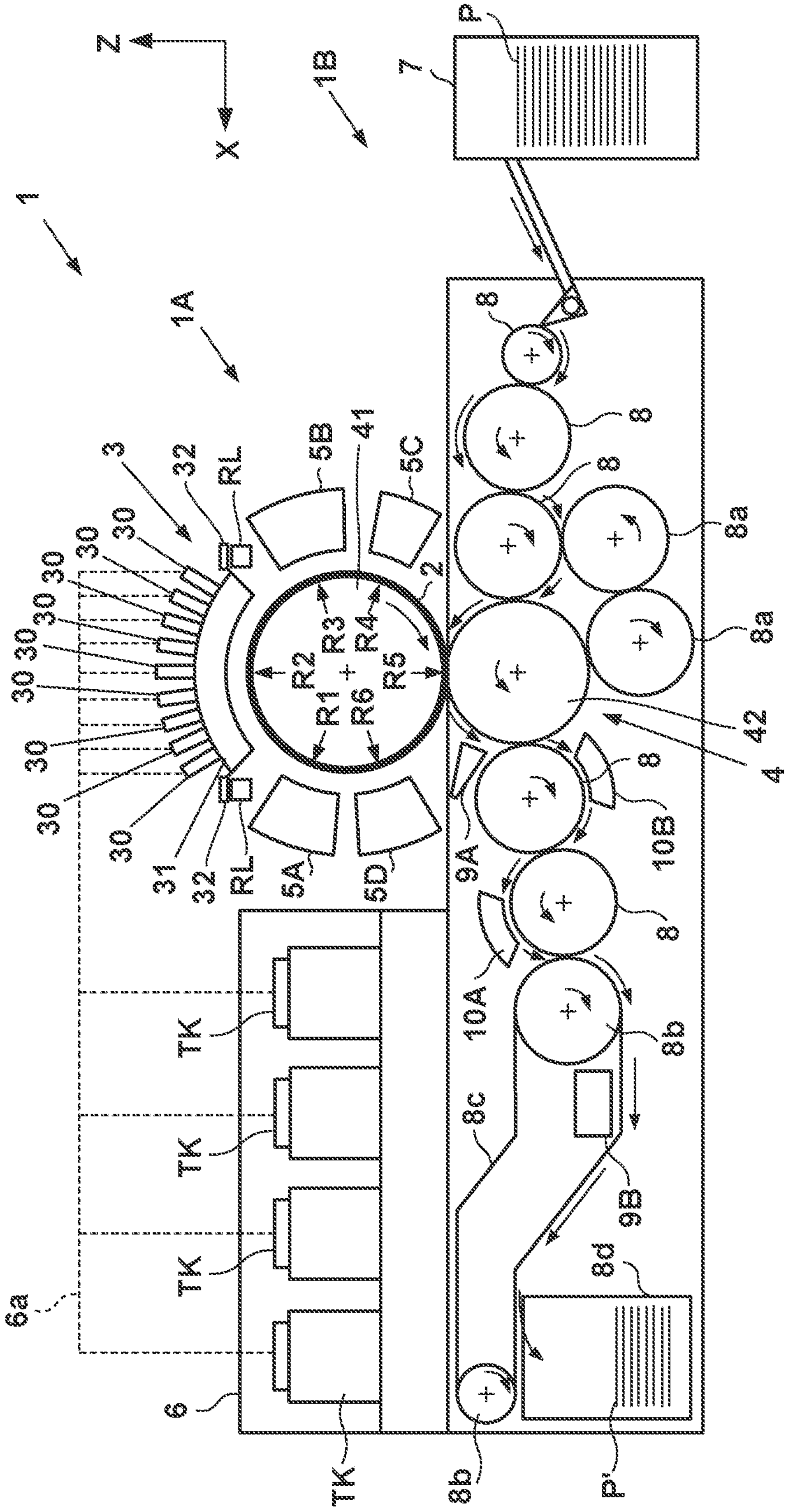
FIG. 1 is a schematic view showing a printing system according to an exemplary embodiment of the present invention.

FIG. 1 is a front view schematically showing a printing system 1 according to an embodiment of the present invention. The printing system 1 is a sheet inkjet printer that forms a printed product P' by transferring an ink image to a print medium P via a transfer member 2. The printing system 1 includes a printing apparatus 1A and a conveyance apparatus 1B. In this embodiment, an X direction, a Y direction, and a Z direction indicate the widthwise direction (total length direction), the depth direction, and the height direction of the printing system 1, respectively. The print medium P is conveyed in the X direction.

Printing Apparatus

The printing apparatus 1A includes a print unit 3, a transfer unit 4, peripheral units 5A to 5D, and a supply unit 6.

Print Unit

Figure 2:
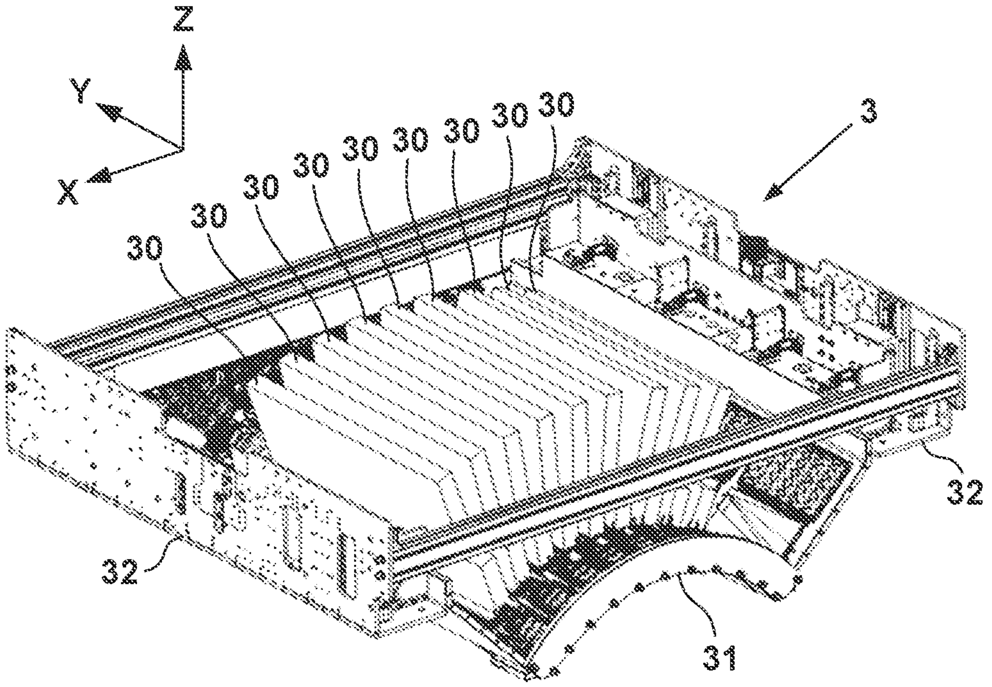
FIG. 2 is a perspective view showing a print unit.

The print unit 3 includes a plurality of printheads 30 and a carriage 31. A description will be made with reference to FIGS. 1 and 2. FIG. 2 is perspective view showing the print unit 3. The printheads 30 discharge liquid ink to the transfer member (intermediate transfer member) 2 and form ink images of a printed image on the transfer member 2.

In this embodiment, each printhead 30 is a full-line head elongated in the Y direction, and nozzles are arrayed in a range where they cover the width of an image printing area of a print medium having a usable maximum size. Each printhead 30 has an ink discharge surface with the opened nozzle on its lower surface, and the ink discharge surface faces the surface of the transfer member 2 via a minute gap (for example, several mm). In this embodiment, the transfer member 2 is configured to move on a circular orbit cyclically, and thus the plurality of printheads 30 are arranged radially.

Each nozzle includes a discharge element. The discharge element is, for example, an element that generates a pressure in the nozzle and discharges ink in the nozzle, and the technique of an inkjet head in a well-known inkjet printer is applicable. For example, an element that discharges ink by causing film boiling in ink with an electrothermal transducer and forming a bubble, an element that discharges ink by an electromechanical transducer (piezoelectric element), an element that discharges ink by using static electricity, or the like can be given as the discharge element. A discharge element that uses the electrothermal transducer can be used from the viewpoint of high-speed and high-density printing.

In this embodiment, nine printheads 30 are provided. The respective printheads 30 discharge different kinds of inks. The different kinds of inks are, for example, different in coloring material and include yellow ink, magenta ink, cyan ink, black ink, and the like. One printhead 30 discharges one kind of ink. However, one printhead 30 may be configured to discharge the plurality of kinds of inks. When the plurality of printheads 30 are thus provided, some of them may discharge colorless ink (for example, clear ink or transfer acceleration liquid (hereinafter referred to as "transfer accelerator")) that does not include a coloring material. Transfer of an image formed on the transfer member 2 to a print medium is accelerated by discharging a transfer accelerator to the transfer member 2 after color ink has been discharged, thus largely reducing an amount of ink remaining on the transfer member 2 after the transfer.

The carriage 31 supports the plurality of printheads 30. The end of each printhead 30 on the side of an ink discharge surface is fixed to the carriage 31. This makes it possible to maintain a gap on the surface between the ink discharge surface and the transfer member 2 more precisely. The carriage 31 is configured to be displaceable while mounting the printheads 30 by the guide of each guide member RL. In this embodiment, the guide members RL are rail members elongated in the Y direction and provided as a pair separately in the X direction. A slide portion 32 is provided on each side of the carriage 31 in the X direction. The slide portions 32 engage with the guide members RL and slide along the guide members RL in the Y direction.

Figure 3:
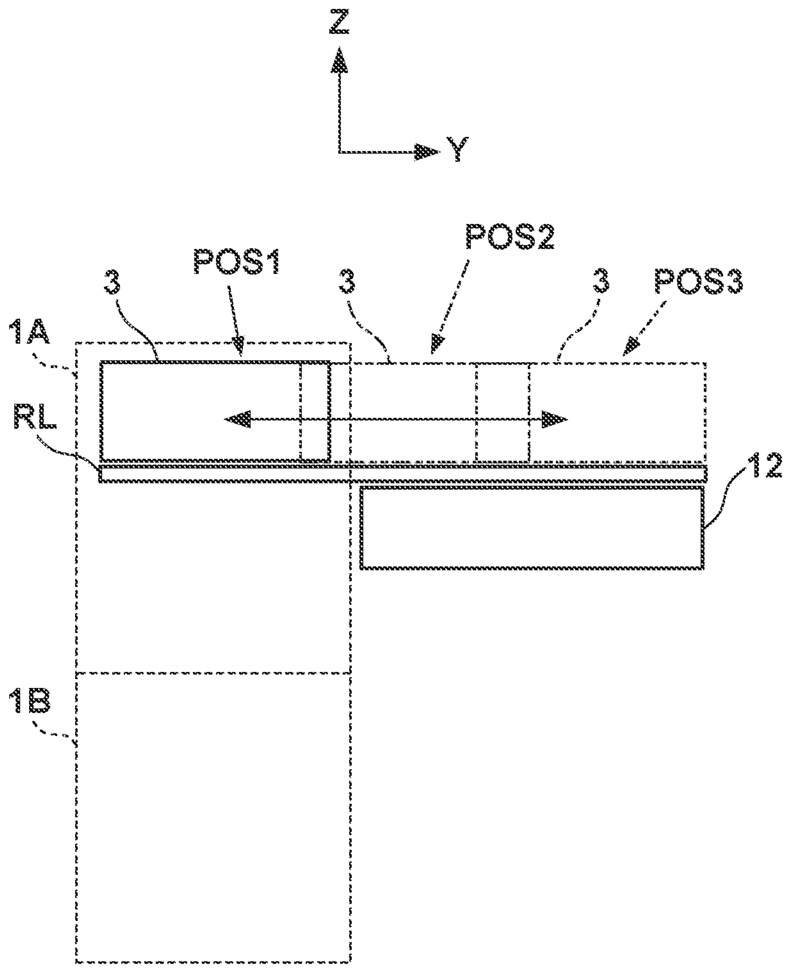
FIG. 3 is an explanatory view showing a displacement mode of the print unit in FIG. 2.

FIG. 3 is a view showing a displacement mode of the print unit 3 and schematically shows the right side surface of the printing system 1. A recovery unit 12 is provided in the rear of the printing system 1. The recovery unit 12 has a mechanism for recovering discharge performance of the printheads 30. For example, a cap mechanism which caps the ink discharge surface of each printhead 30, a wiper mechanism which wipes the ink discharge surface, and a suction mechanism which sucks ink in the printhead 30 by a negative pressure from the ink discharge surface can be given as such mechanisms.

The guide member RL is elongated over the recovery unit 12 from the side of the transfer member 2. By the guide of the guide member RL, the print unit 3 is displaceable between a discharge position POS1 at which the print unit 3 is indicated by a solid line and a recovery position POS3 at which the print unit 3 is indicated by a broken line, and is moved by a driving mechanism (not shown).

The discharge position POS1 is a position at which the print unit 3 discharges ink to the transfer member 2 and a position at which the ink discharge surface of each printhead 30 faces the surface of the transfer member 2. The recovery position POS3 is a position retracted from the discharge position POS1 and a position at which the print unit 3 is positioned above the recovery unit 12. The recovery unit 12 can perform recovery processing on the printheads 30 when the print unit 3 is positioned at the recovery position POS3. In this embodiment, the recovery unit 12 can also perform the recovery processing in the middle of movement before the print unit 3 reaches the recovery position POS3. There is a preliminary recovery position POS2 between the discharge position POS1 and the recovery position POS3. The recovery unit 12 can perform preliminary recovery processing on the printheads 30 at the preliminary recovery position POS2 while the printheads 30 move from the discharge position POS1 to the recovery position POS3.

Transfer Unit

The transfer unit 4 will be described with reference to FIG. 1. The transfer unit 4 includes a transfer drum 41 and a pressurizing drum 42. Each of these drums is a rotating body that rotates about a rotation axis in the Y direction and has a columnar outer peripheral surface. In FIG. 1, arrows shown in respective views of the transfer drum 41 and the pressurizing drum 42 indicate their rotation directions. The transfer drum 41 rotates clockwise, and the pressurizing drum 42 rotates anticlockwise.

The transfer drum 41 is a support member that supports the transfer member 2 on its outer peripheral surface. The transfer member 2 is provided on the outer peripheral surface of the transfer drum 41 continuously or intermittently in a circumferential direction. If the transfer member 2 is provided continuously, it is formed into an endless swath. If the transfer member 2 is provided intermittently, it is formed into swaths with ends dividedly into a plurality of segments. The respective segments can be arranged in an arc at an equal pitch on the outer peripheral surface of the transfer drum 41.

The transfer member 2 moves cyclically on the circular orbit by rotating the transfer drum 41. By the rotational phase of the transfer drum 41, the position of the transfer member 2 can be discriminated into a processing area R1 before discharge, a discharge area R2, processing areas R3 and R4 after discharge, a transfer area R5, and a processing area R6 after transfer. The transfer member 2 passes through these areas cyclically.

The processing area R1 before discharge is an area where preprocessing is performed on the transfer member 2 before the print unit 3 discharges ink and an area where the peripheral unit 5A performs processing. In this embodiment, a reactive liquid is applied. The discharge area R2 is a formation area where the print unit 3 forms an ink image by discharging ink to the transfer member 2. The processing areas R3 and R4 after discharge are processing areas where processing is performed on the ink image after ink discharge. The processing area R3 after discharge is an area where the peripheral unit 5B performs processing, and the processing area R4 after discharge is an area where the peripheral unit 5C performs processing. The transfer area R5 is an area where the transfer unit 4 transfers the ink image on the transfer member 2 to the print medium P. The processing area R6 after transfer is an area where post processing is performed on the transfer member 2 after transfer and an area where the peripheral unit 5D performs processing.

In this embodiment, the discharge area R2 is an area with a predetermined section. The other areas R1 and R3 to R6 have narrower sections than the discharge area R2. Comparing to the face of a clock, in this embodiment, the processing area R1 before discharge is positioned at almost 10 o'clock, the discharge area R2 is in a range from almost 11 o'clock to 1 o'clock, the processing area R3 after discharge is positioned at almost 2 o'clock, and the processing area R4 after discharge is positioned at almost 4 o'clock. The transfer area R5 is positioned at almost 6 o'clock, and the processing area R6 after transfer is an area at almost 8 o'clock.

The transfer member 2 may be formed by a single layer but may be an accumulative body of a plurality of layers. If the transfer member 2 is formed by the plurality of layers, it may include three layers of, for example, a surface layer, an elastic layer, and a compressed layer. The surface layer is an outermost layer having an image formation surface where the ink image is formed. By providing the compressed layer, the compressed layer absorbs deformation and disperses a local pressure fluctuation, making it possible to maintain transferability even at the time of high-speed printing. The elastic layer is a layer between the surface layer and the compressed layer.

As a material for the surface layer, various materials such as a resin and a ceramic can be used appropriately. In respect of durability or the like, however, a material high in compressive modulus can be used. More specifically, an acrylic resin, an acrylic silicone resin, a fluoride-containing resin, a condensate obtained by condensing a hydrolyzable organosilicon compound, and the like can be given. The surface layer that has undergone a surface treatment may be used in order to improve wettability of the reactive liquid, the transferability of an image, or the like. Frame processing, a corona treatment, a plasma treatment, a polishing treatment, a roughing treatment, an active energy beam irradiation treatment, an ozone treatment, a surfactant treatment, a silane coupling treatment, or the like can be given as the surface treatment. A plurality of them may be combined. It is also possible to provide any desired surface shape in the surface layer.

For example, acrylonitrile-butadiene rubber, acrylic rubber, chloroprene rubber, urethane rubber, silicone rubber, or the like can be given as a material for the compressed layer. When such a rubber material is formed, a porous rubber material may be formed by blending a predetermined amount of a vulcanizing agent, vulcanizing accelerator, or the like and further blending a foaming agent, or a filling agent such as hollow fine particles or salt as needed. Consequently, a bubble portion is compressed along with a volume change with respect to various pressure fluctuations, and thus deformation in directions other than a compression direction is small, making it possible to obtain more stable transferability and durability. As the porous rubber material, there are a material having an open cell structure in which respective pores continue to each other and a material having a closed cell structure in which the respective pores are independent of each other. However, either structure may be used, or both of these structures may be used.

As a member for the elastic layer, the various materials such as the resin and the ceramic can be used appropriately. In respect of processing characteristics, various materials of an elastomer material and a rubber material can be used. More specifically, for example, fluorosilicone rubber, phenyl silicone rubber, fluorine rubber, chloroprene rubber, urethane rubber, nitrile rubber, and the like can be given. In addition, ethylene propylene rubber, natural rubber, styrene rubber, isoprene rubber, butadiene rubber, the copolymer of ethylene/propylene/butadiene, nitrile-butadiene rubber, and the like can be given. In particular, silicone rubber, fluorosilicone rubber, and phenyl silicon rubber are advantageous in terms of dimensional stability and durability because of their small compression set. They are also advantageous in terms of transferability because of their small elasticity change by a temperature.

Between the surface layer and the elastic layer and between the elastic layer and the compressed layer, various adhesives or double-sided adhesive tapes can also be used in order to fix them to each other. The transfer member 2 may also include a reinforce layer high in compressive modulus in order to suppress elongation in a horizontal direction or maintain resilience when attached to the transfer drum 41. Woven fabric may be used as a reinforce layer. The transfer member 2 can be manufactured by combining the respective layers formed by the materials described above in any desired manner.

The outer peripheral surface of the pressurizing drum 42 is pressed against the transfer member 2. At least one grip mechanism which grips the leading edge portion of the print medium P is provided on the outer peripheral surface of the pressurizing drum 42. A plurality of grip mechanisms may be provided separately in the circumferential direction of the pressurizing drum 42. The ink image on the transfer member 2 is transferred to the print medium P when it passes through a nip portion between the pressurizing drum 42 and the transfer member 2 while being conveyed in tight contact with the outer peripheral surface of the pressurizing drum 42.

The transfer drum 41 and the pressurizing drum 42 share a driving source such as a motor that drives them. A driving force can be delivered by a transmission mechanism such as a gear mechanism.

Peripheral Unit

The peripheral units 5A to 5D are arranged around the transfer drum 41. In this embodiment, the peripheral units 5A to 5D are specifically an application unit, an absorption unit, a heating unit, and a cleaning unit in order.

The application unit 5A is a mechanism which applies the reactive liquid onto the transfer member 2 before the print unit 3 discharges ink. The reactive liquid is a liquid that contains a component increasing an ink viscosity. An increase in ink viscosity here means that a coloring material, a resin, and the like that form the ink react chemically or suck physically by contacting the component that increases the ink viscosity, recognizing the increase in ink viscosity. This increase in ink viscosity includes not only a case in which an increase in viscosity of entire ink is recognized but also a case in which a local increase in viscosity is generated by coagulating some of components such as the coloring material and the resin that form the ink.

The component that increases the ink viscosity can use, without particular limitation, a substance such as metal ions or a polymeric coagulant that causes a pH change in ink and coagulates the coloring material in the ink, and can use an organic acid. For example, a roller, a printhead, a die coating apparatus (die coater), a blade coating apparatus (blade coater), or the like can be given as a mechanism which applies the reactive liquid. If the reactive liquid is applied to the transfer member 2 before the ink is discharged to the transfer member 2, it is possible to immediately fix ink that reaches the transfer member 2. This makes it possible to suppress bleeding caused by mixing adjacent inks.

The absorption unit 5B is a mechanism which absorbs a liquid component from the ink image on the transfer member 2 before transfer. It is possible to suppress, for example, a blur of an image printed on the print medium P by decreasing the liquid component of the ink image. Describing a decrease in liquid component from another point of view, it is also possible to represent it as condensing ink that forms the ink image on the transfer member 2. Condensing the ink means increasing the content of a solid content such as a coloring material or a resin included in the ink with respect to the liquid component by decreasing the liquid component included in the ink.

The absorption unit 5B includes, for example, a liquid absorbing member that decreases the amount of the liquid component of the ink image by contacting the ink image. The liquid absorbing member may be formed on the outer peripheral surface of the roller or may be formed into an endless sheet-like shape and run cyclically. In terms of protection of the ink image, the liquid absorbing member may be moved in synchronism with the transfer member 2 by making the moving speed of the liquid absorbing member equal to the peripheral speed of the transfer member 2.

The liquid absorbing member may include a porous body that contacts the ink image. The pore size of the porous body on the surface that contacts the ink image may be equal to or smaller than 10 μm in order to suppress adherence of an ink solid content to the liquid absorbing member. The pore size here refers to an average diameter and can be measured by a known means such as a mercury intrusion technique, a nitrogen adsorption method, an SEM image observation, or the like. Note that the liquid component does not have a fixed shape, and is not particularly limited if it has fluidity and an almost constant volume. For example, water, an organic solvent, or the like contained in the ink or reactive liquid can be given as the liquid component.

The heating unit 5C is a mechanism which heats the ink image on the transfer member 2 before transfer. A resin in the ink image melts by heating the ink image, improving transferability to the print medium P. A heating temperature can be equal to or higher than the minimum film forming temperature (MFT) of the resin. The MFT can be measured by each apparatus that complies with a generally known method such as JIS K 6828-2: 2003 or ISO 2115: 1996. From the viewpoint of transferability and image robustness, the ink image may be heated at a temperature higher than the MFT by 10° C. or higher, or may further be heated at a temperature higher than the MFT by 20° C. or higher. The heating unit 5C can use a known heating device, for example, various lamps such as infrared rays, a warm air fan, or the like. An infrared heater can be used in terms of heating efficiency.

The cleaning unit 5D is a mechanism which cleans the transfer member 2 after transfer. The cleaning unit 5D removes ink remaining on the transfer member 2, dust on the transfer member 2, or the like. The cleaning unit 5D can use a known method, for example, a method of bringing a porous member into contact with the transfer member 2, a method of scraping the surface of the transfer member 2 with a brush, a method of scratching the surface of the transfer member 2 with a blade, or the like as needed. A known shape such as a roller shape or a web shape can be used for a cleaning member used for cleaning.

As described above, in this embodiment, the application unit 5A, the absorption unit 5B, the heating unit 5C, and the cleaning unit 5D are included as the peripheral units. However, cooling functions of the transfer member 2 may be applied, or cooling units may be added to these units. In this embodiment, the temperature of the transfer member 2 may be increased by heat of the heating unit 5C. If the ink image exceeds the boiling point of water as a prime solvent of ink after the print unit 3 discharges ink to the transfer member 2, performance of liquid component absorption by the absorption unit 5B may be degraded. It is possible to maintain the performance of liquid component absorption by cooling the transfer member 2 such that the temperature of the discharged ink is maintained below the boiling point of water.

The cooling unit may be an air blowing mechanism which blows air to the transfer member 2, or a mechanism which brings a member (for example, a roller) into contact with the transfer member 2 and cools this member by air-cooling or water-cooling. The cooling unit may be a mechanism which cools the cleaning member of the cleaning unit 5D. A cooling timing may be a period before application of the reactive liquid after transfer.

<Supply Unit>

The supply unit 6 is a mechanism which supplies ink to each printhead 30 of the print unit 3. The supply unit 6 may be provided on the rear side of the printing system 1. The supply unit 6 includes a reservoir TK that reserves (stores) ink for each kind of ink. Each reservoir TK may be made of a main tank and a sub tank. Each reservoir TK and a corresponding one of the printheads 30 communicate with each other by a liquid passageway 6*a*, and ink is supplied from the reservoir TK to the printhead 30. The liquid passageway 6*a* may circulate ink between the reservoirs TK and the printheads 30. The supply unit 6 may include, for example, a pump that circulates ink. A deaerating mechanism which deaerates bubbles in ink may be provided in the middle of the liquid passageway 6*a* or in each reservoir TK. A valve that adjusts the fluid pressure of ink and an atmospheric pressure may be provided in the middle of the liquid passageway 6*a* or in each reservoir TK. The heights of each reservoir TK and each printhead 30 in the Z direction may be designed such that the liquid surface of ink in the reservoir TK is positioned lower than the ink discharge surface of the printhead 30.

Conveyance Apparatus

The conveyance apparatus 1B is an apparatus that feeds the print medium P to the transfer unit 4 and discharges, from the transfer unit 4, the printed product P' to which the ink image was transferred. The conveyance apparatus 1B includes a feeding unit 7, a plurality of conveyance drums 8 and 8*a*, two sprockets 8*b*, a chain 8*c*, and a collection unit 8*d*. In FIG. 1, an arrow inside a view of each constituent element in the conveyance apparatus 1B indicates a rotation direction of the constituent element, and an arrow outside the view of each constituent element indicates a conveyance path of the print medium P or the printed product P'. The print medium P is conveyed from the feeding unit 7 to the transfer unit 4, and the printed product P' is conveyed from the transfer unit 4 to the collection unit 8*d*. The side of the feeding unit 7 may be referred to as an upstream side in a conveyance direction, and the side of the collection unit 8*d* may be referred to as a downstream side.

The feeding unit 7 includes a stacking unit where the plurality of print media P are stacked and a feeding mechanism which feeds the print media P one by one from the stacking unit to the most upstream conveyance drum 8. Each of the conveyance drums 8 and 8*a* is a rotating body that rotates about the rotation axis in the Y direction and has a columnar outer peripheral surface. At least one grip mechanism which grips the leading edge portion of the print medium P (printed product P') is provided on the outer peripheral surface of each of the conveyance drums 8 and 8*a*. A gripping operation and release operation of each grip mechanism may be controlled such that the print medium P is transferred between the adjacent conveyance drums.

The two conveyance drums 8*a* are used to reverse the print medium P. When the print medium P undergoes double-side printing, it is not transferred to the conveyance drum 8 adjacent on the downstream side but transferred to the conveyance drums 8*a* from the pressurizing drum 42 after transfer onto the surface. The print medium P is reversed via the two conveyance drums 8*a* and transferred to the pressurizing drum 42 again via the conveyance drums 8 on the upstream side of the pressurizing drum 42. Consequently, the reverse surface of the print medium P faces the transfer drum 41, transferring the ink image to the reverse surface.

The chain 8*c* is wound between the two sprockets 8*b*. One of the two sprockets 8*b* is a driving sprocket, and the other is a driven sprocket. The chain 8*c* runs cyclically by rotating the driving sprocket. The chain 8*c* includes a plurality of grip mechanisms spaced apart from each other in its longitudinal direction. Each grip mechanism grips the end of the printed product P'. The printed product P' is transferred from the conveyance drum 8 positioned at a downstream end to each grip mechanism of the chain 8*c*, and the printed product P' gripped by the grip mechanism is conveyed to the collection unit 8*d* by running the chain 8*c*, releasing gripping. Consequently, the printed product P' is stacked in the collection unit 8*d*.

<Post Processing Unit>

The conveyance apparatus 1B includes post processing units 10A and 10B. The post processing units 10A and 10B are mechanisms which are arranged on the downstream side of the transfer unit 4, and perform post processing on the printed product P'. The post processing unit 10A performs processing on the obverse surface of the printed product P', and the post processing unit 10B performs processing on the reverse surface of the printed product P'. The contents of the post processing include, for example, coating that aims at protection, providing glossiness, and the like of an image on the image printed surface of the printed product P'. For example, liquid application, sheet welding, lamination, and the like can be given as examples of coating.

Inspection Unit

The conveyance apparatus 1B includes inspection units 9A and 9B. The inspection units 9A and 9B are mechanisms which are arranged on the downstream side of the transfer unit 4, and inspect the printed product P'.

In this embodiment, the inspection unit 9A is an image capturing apparatus that captures an image printed on the printed product P' and includes an image sensor, for example, a CCD sensor, a CMOS sensor, or the like. The inspection unit 9A captures a printed image while a printing operation is performed continuously. Based on the image captured by the inspection unit 9A, it is possible to confirm a temporal change in tint or the like of the printed image and determine whether to correct image data or print data. In this embodiment, the inspection unit 9A has an imaging range set on the outer peripheral surface of the pressurizing drum 42 and is arranged to be able to partially capture the printed image immediately after transfer. The inspection unit 9A may inspect all printed images or may inspect the images every predetermined number of sheets.

In this embodiment, the inspection unit 9B is also an image capturing apparatus that captures an image printed on the printed product P' and includes an image sensor, for example, a CCD sensor, a CMOS sensor, or the like. The inspection unit 9B captures a printed image in a test printing operation. The inspection unit 9B can capture the entire printed image. Based on the image captured by the inspection unit 9B, it is possible to perform basic settings for various correction operations regarding print data. In this embodiment, the inspection unit 9B is arranged at a position to capture the printed product P' conveyed by the chain 8*c*. When the inspection unit 9B captures the printed image, it captures the entire image by temporarily suspending the run of the chain 8*c*. The inspection unit 9B may be a scanner that scans the printed product P'.

Control Unit

Figure 4:
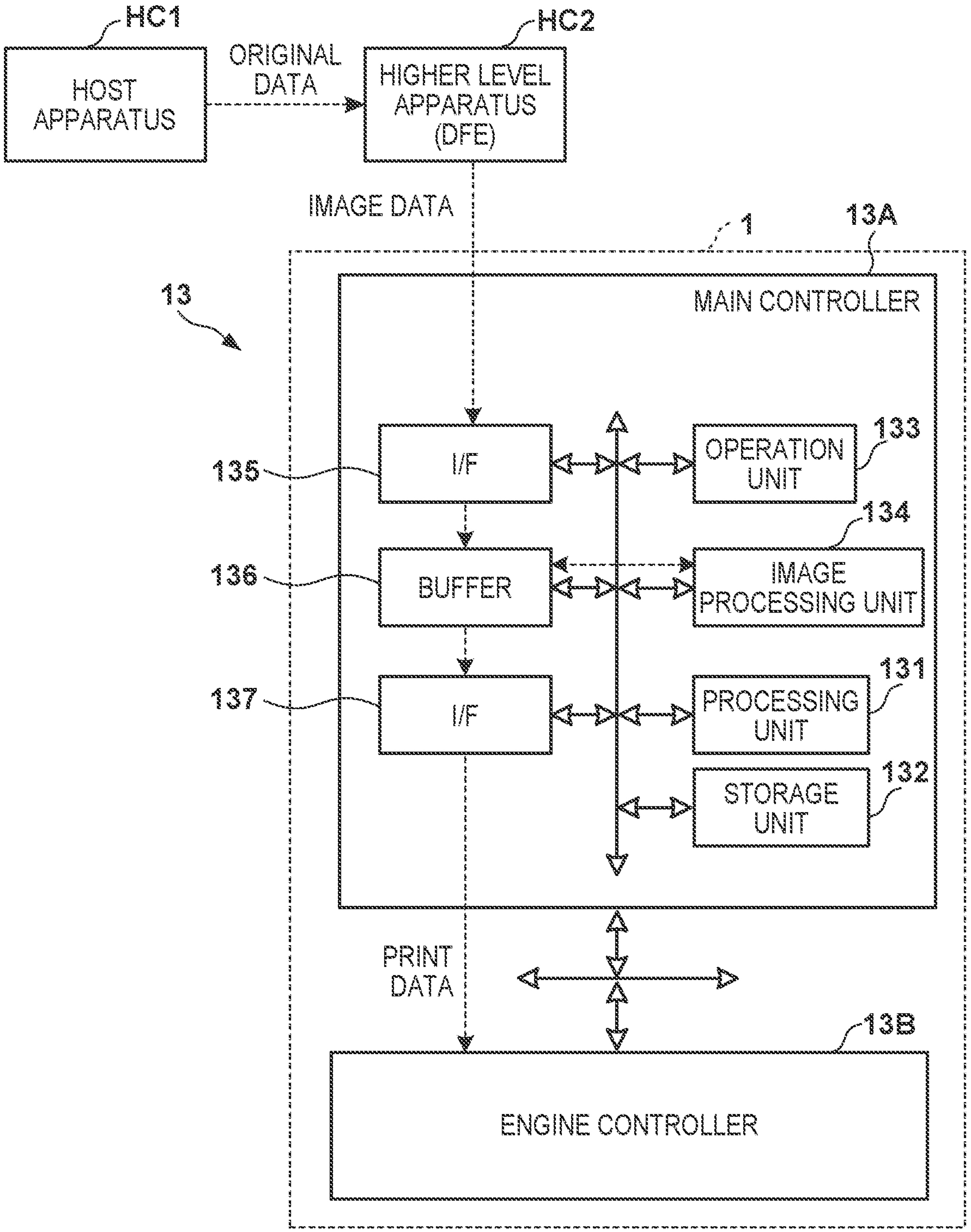
FIG. 4 is a block diagram showing a control system of the printing system in FIG. 1.
Figure 5:
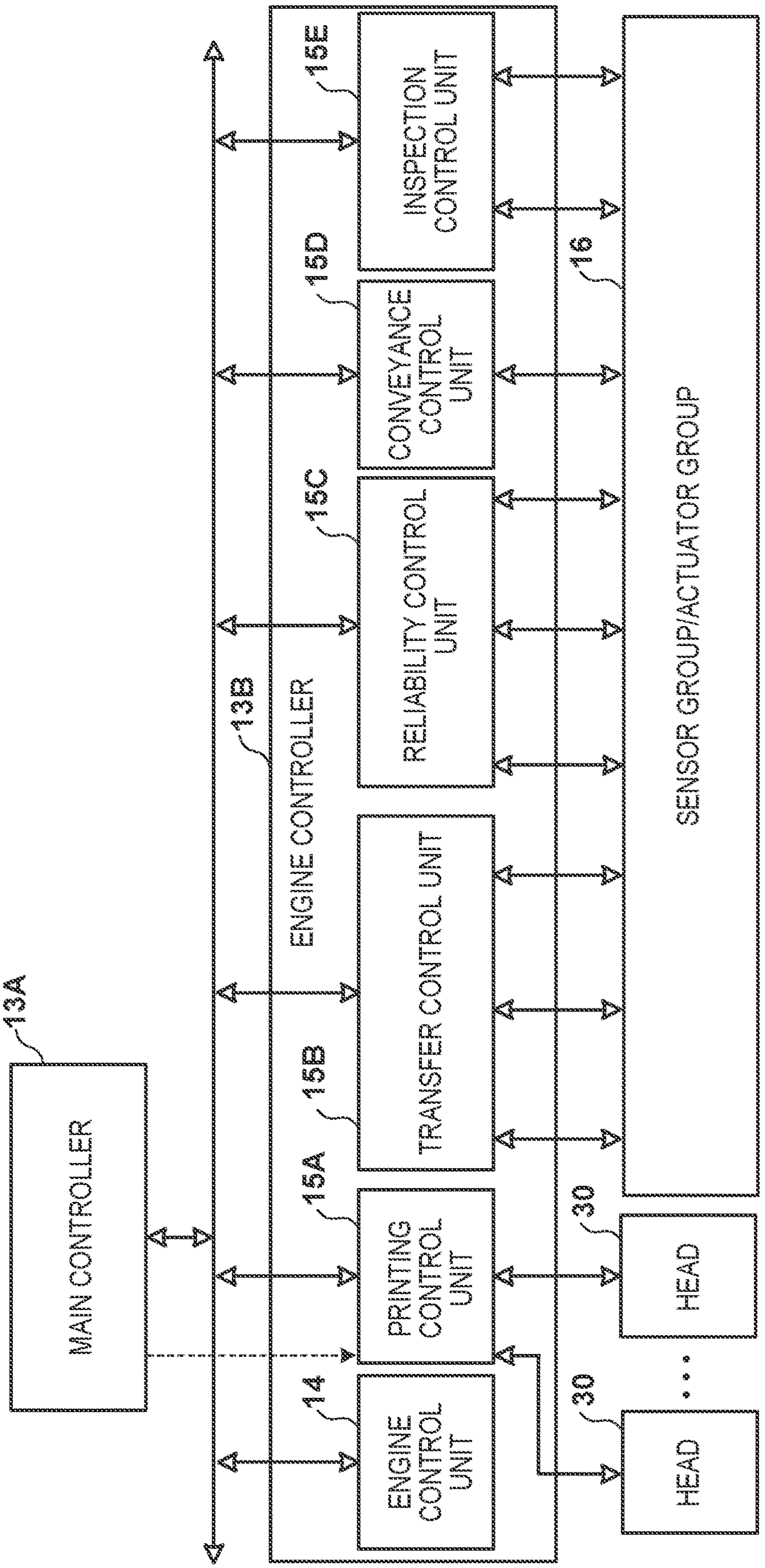
FIG. 5 is a block diagram showing the control system of the printing system in FIG. 1.

A control unit of the printing system 1 will be described next. FIGS. 4 and 5 are block diagrams each showing a control unit 13 of the printing system 1. The control unit 13 is communicably connected to a higher level apparatus (DFE) HC2, and the higher level apparatus HC2 is communicably connected to a host apparatus HC1.

The host apparatus HC1 may be, for example, a PC (Personal Computer) serving as an information processing apparatus, or a server apparatus. A communication method between the host apparatus HC1 and the higher level apparatus HC2 may be, without particular limitation, either wired or wireless communication.

Original data to be the source of a printed image is generated or saved in the host apparatus HC1. The original data here is generated in the format of, for example, an electronic file such as a document file or an image file. This original data is transmitted to the higher level apparatus HC2. In the higher level apparatus HC2, the received original data is converted into a data format (for example, RGB data that represents an image by RGB) available by the control unit 13. The converted data is transmitted from the higher level apparatus HC2 to the control unit 13 as image data. The control unit 13 starts a printing operation based on the received image data.

In this embodiment, the control unit 13 is roughly divided into a main controller 13A and an engine controller 13B. The main controller 13A includes a processing unit 131, a storage unit 132, an operation unit 133, an image processing unit 134, a communication I/F (interface) 135, a buffer 136, and a communication I/F 137.

The processing unit 131 is a processor such as a CPU, executes programs stored in the storage unit 132, and controls the entire main controller 13A. The storage unit 132 is a storage device such as a RAM, a ROM, a hard disk, or an SSD, stores data and the programs executed by the processing unit (CPU) 131, and provides the processing unit (CPU) 131 with a work area. An external storage unit may further be provided in addition to the storage unit 132. The operation unit 133 is, for example, an input device such as a touch panel, a keyboard, or a mouse and accepts a user instruction. The operation unit 133 may be formed by an input unit and a display unit integrated with each other. Note that a user operation is not limited to an input via the operation unit 133, and an arrangement may be possible in which, for example, an instruction is accepted from the host apparatus HC1 or the higher level apparatus HC2.

The image processing unit 134 is, for example, an electronic circuit including an image processing processor. The buffer 136 is, for example, a RAM, a hard disk, or an SSD. The communication I/F 135 communicates with the higher level apparatus HC2, and the communication I/F 137 communicates with the engine controller 13B. In FIG. 4, broken-line arrows exemplify the processing sequence of image data. Image data received from the higher level apparatus HC2 via the communication I/F 135 is accumulated in the buffer 136. The image processing unit 134 reads out the image data from the buffer 136, performs predetermined image processing on the readout image data, and stores the processed data in the buffer 136 again. The image data after the image processing stored in the buffer 136 is transmitted from the communication I/F 137 to the engine controller 13B as print data used by a print engine.

As shown in FIG. 5, the engine controller 13B includes engine control units 14 and 15A to 15E, and obtains a detection result of a sensor group/actuator group 16 of the printing system 1 and controls driving of the groups. Each of these control units includes a processor such as a CPU, a storage device such as a RAM or a ROM, and an interface with an external device. Note that the division of the control units is merely illustrative, and a plurality of subdivided control units may perform some of control operations or conversely, the plurality of control units may be integrated with each other, and one control unit may be configured to implement their control contents.

The engine control unit 14 controls the entire engine controller 13B. The printing control unit 15A converts print data received from the main controller 13A into raster data or the like in a data format suitable for driving of the printheads 30. The printing control unit 15A controls discharge of each printhead 30.

The transfer control unit 15B controls the application unit 5A, the absorption unit 5B, the heating unit 5C, and the cleaning unit 5D.

The reliability control unit 15C controls the supply unit 6, the recovery unit 12, and a driving mechanism which moves the print unit 3 between the discharge position POS1 and the recovery position POS3.

The conveyance control unit 15D controls driving of the transfer unit 4 and controls the conveyance apparatus 1B. The inspection control unit 15E controls the inspection unit 9B and the inspection unit 9A.

Of the sensor group/actuator group 16, the sensor group includes a sensor that detects the position and speed of a movable part, a sensor that detects a temperature, an image sensor, and the like. The actuator group includes a motor, an electromagnetic solenoid, an electromagnetic valve, and the like.

Operation Example

Figure 6:
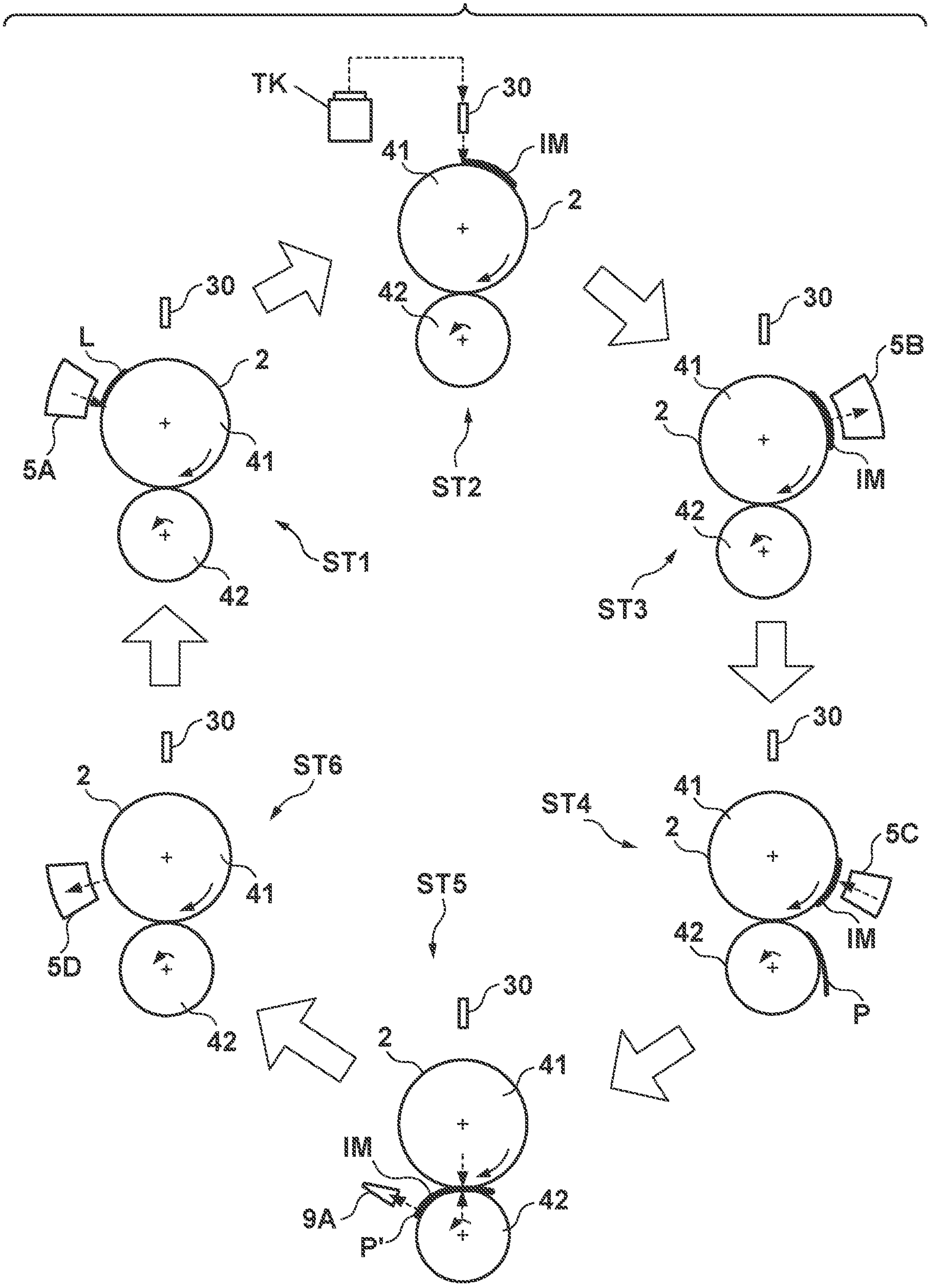
FIG. 6 is an explanatory view showing an example of the operation of the printing system in FIG. 1.

FIG. 6 is a view schematically showing an example of a printing operation. Respective steps below are performed cyclically while rotating the transfer drum 41 and the pressurizing drum 42. As shown in a state ST1, first, a reactive liquid L is applied from the application unit 5A onto the transfer member 2. A portion to which the reactive liquid L on the transfer member 2 is applied moves along with the rotation of the transfer drum 41. When the portion to which the reactive liquid L is applied reaches under the printhead 30, ink is discharged from the printhead 30 to the transfer member 2 as shown in a state ST2. Consequently, an ink image IM is formed. At this time, the discharged ink mixes with the reactive liquid L on the transfer member 2, promoting coagulation of the coloring materials. The discharged ink is supplied from the reservoir TK of the supply unit 6 to the printhead 30.

The ink image IM on the transfer member 2 moves along with the rotation of the transfer member 2. When the ink image IM reaches the absorption unit 5B, as shown in a state ST3, the absorption unit 5B absorbs a liquid component from the ink image IM. When the ink image IM reaches the heating unit 5C, as shown in a state ST4, the heating unit 5C heats the ink image IM, a resin in the ink image IM melts, and a film of the ink image IM is formed. In synchronism with such formation of the ink image IM, the conveyance apparatus 1B conveys the print medium P.

As shown in a state ST5, the ink image IM and the print medium P reach the nip portion between the transfer member 2 and the pressurizing drum 42, the ink image IM is transferred to the print medium P, and the printed product P' is formed. Passing through the nip portion, the inspection unit 9A captures an image printed on the printed product P' and inspects the printed image. The conveyance apparatus 1B conveys the printed product P' to the collection unit 8*d*.

When a portion where the ink image IM on the transfer member 2 is formed reaches the cleaning unit 5D, it is cleaned by the cleaning unit 5D as shown in a state ST6. After the cleaning, the transfer member 2 rotates once, and transfer of the ink image to the print medium P is performed repeatedly in the same procedure. The description above has been given such that transfer of the ink image IM to one print medium P is performed once in one rotation of the transfer member 2 for the sake of easy understanding. It is possible, however, to continuously perform transfer of the ink image IM to the plurality of print media P in one rotation of the transfer member 2.

Each printhead 30 needs maintenance if such a printing operation continues.

Figure 7:
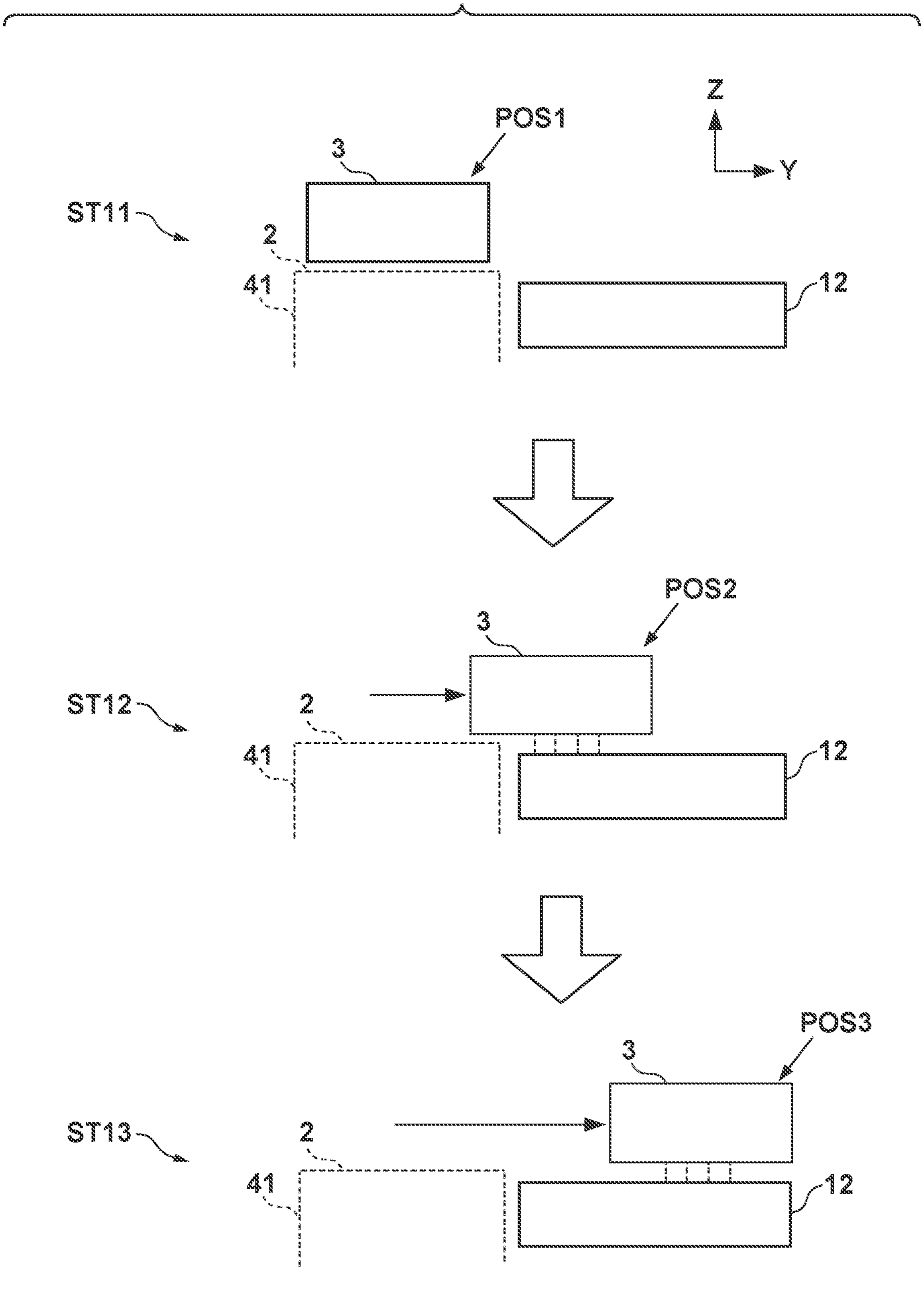
FIG. 7 is an explanatory view showing an example of the operation of the printing system in FIG. 1.

FIG. 7 shows an operation example at the time of maintenance of each printhead 30. A state ST11 shows a state in which the print unit 3 is positioned at the discharge position POS1. A state ST12 shows a state in which the print unit 3 passes through the preliminary recovery position POS2. Under passage, the recovery unit 12 performs a process of recovering discharge performance of each printhead 30 of the print unit 3. Subsequently, as shown in a state ST13, the recovery unit 12 performs the process of recovering the discharge performance of each printhead 30 in a state in which the print unit 3 is positioned at the recovery position POS3.

Description of Detailed Arrangement of Printhead (FIGS. 8A to 10)

Figure 8A:
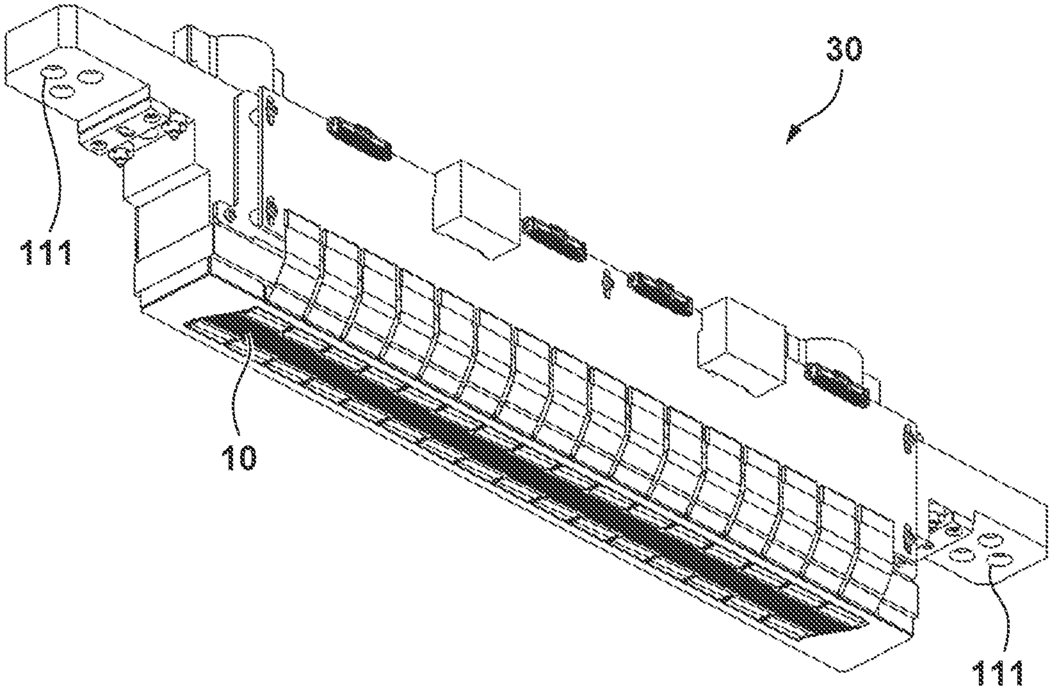
FIGS. 8A and 8B are perspective views each showing the arrangement of the printhead.
Figure 8B:
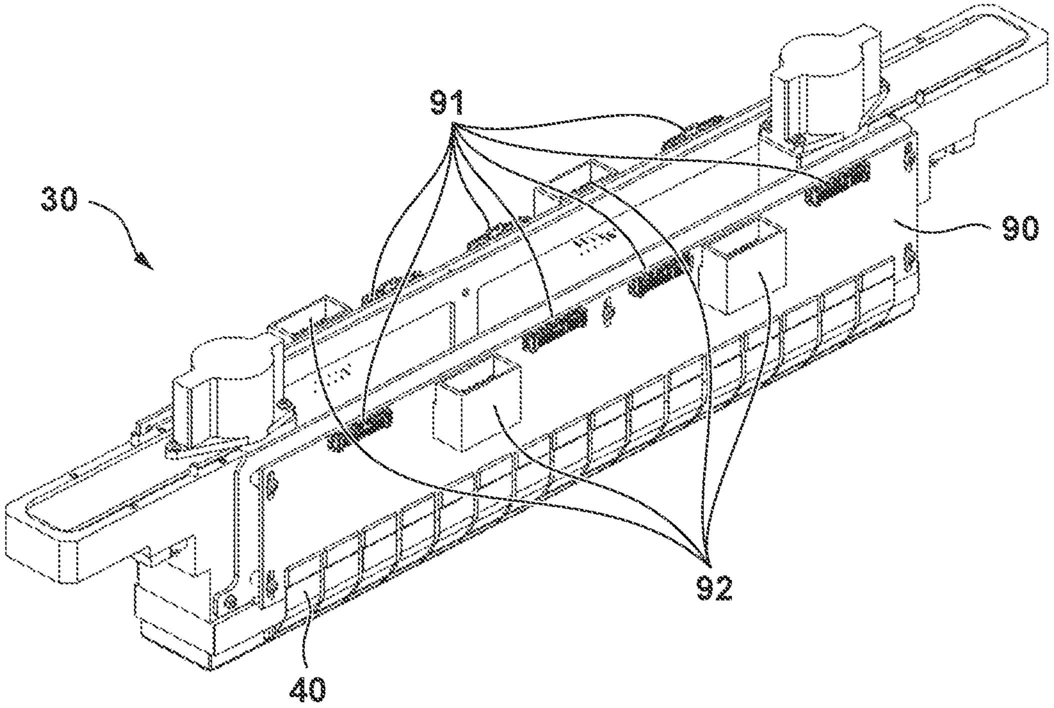

FIGS. 8A and 8B are perspective views each showing the arrangement of the printhead 30.

FIG. 8A is the perspective view showing the printhead 30 when viewed from an obliquely downward direction. FIG. 8B is the perspective view showing the printhead 30 when viewed from an obliquely upward direction.

The printhead 30 is a full-line printhead that arrays a plurality of element substrates 10 each capable of discharging one-color ink on a line (arranges them in line) and has a print width corresponding to the width of a print medium.

As shown in FIG. 8A, connection portions 111 provided in two end portions of the printhead 30 are connected to an ink supplying mechanism of the printing apparatus. Consequently, ink is supplied from the ink supplying mechanism to the printhead 30, and the ink that has passed through the printhead 30 is collected to the ink supplying mechanism. Thus, the ink can circulate via a channel of the ink supplying mechanism and a channel of the printhead 30.

As shown in FIG. 8B, the printhead 30 includes signal input terminals 91 electrically connected to the respective element substrates 10 and flexible wiring substrates 40 via an electric wiring substrate 90, and electric supply terminals 92. The signal input terminals 91 and the electric supply terminals 92 are electrically connected to the printing control unit 15A of the printing apparatus, and supply driving signals and power needed for discharge, respectively, to the element substrates 10. It is possible to reduce the number of signal input terminals 91 and electric supply terminals 92 as compared with the number of element substrates 10 by aggregating wirings with an electric circuit in the electric wiring substrate 90. This can reduce the number of electrical connection portions that need to be detached when the printhead 30 is attached to the print unit 3, or the printhead 30 is replaced.

Note that in this embodiment, an ink circulation type printhead is used. However, a conventional ink consumption type printhead without an ink circulation mechanism may be used.

If a plurality of head chips are arranged in a predetermined direction to form a full-line printhead with a longer print width while having a uniform nozzle pitch, a joint is created between the head chips. To effectively use all nozzles integrated in the head chips, this embodiment adopts the head chips each having a parallelogram shape.

Figure 9:
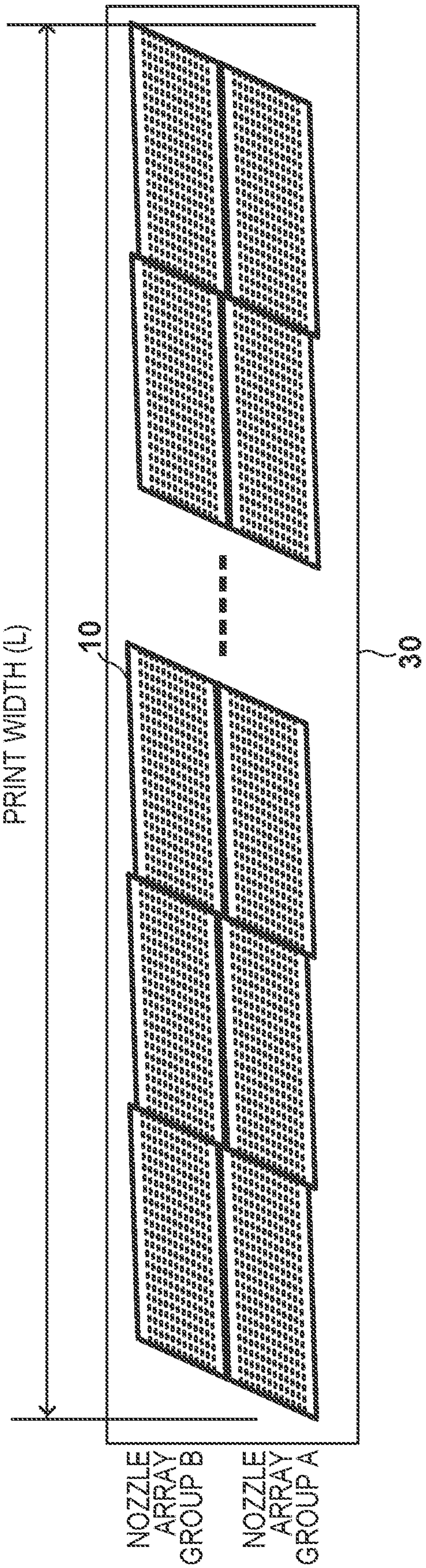
FIG. 9 is a view showing the joining arrangement of parallelogram-shaped head chips.

FIG. 9 is a view showing the joining arrangement of parallelogram-shaped head chips (head substrates).

FIG. 9 shows an example of joining the plurality of head chips (head substrates) 10. As shown in FIG. 9, a print width (L) corresponding to the width of the print medium P is achieved by joining the plurality of head substrates 10 in the nozzle array direction. The number of nozzle arrays is increased by connecting two head chips (head substrates) in a direction intersecting the nozzle array direction. In the example shown in FIG. 9, 18 head chips (head substrates) are joined in the nozzle array direction and two head chips (head substrates) are connected in the direction intersecting the nozzle array direction. The same color ink is discharged from nozzles integrated in the thus arranged 36 head chips (head substrates) 10 in total.

In other words, one printhead 30 discharges one color ink. Since the nine printheads 30 are mounted on this printing system, as described above, full-color printing can be performed by discharging nine color inks at maximum. Note that in this embodiment, one of the printheads 30 discharges a colorless transfer accelerator, and the remaining eight printheads 30 discharge color inks.

Figure 10:
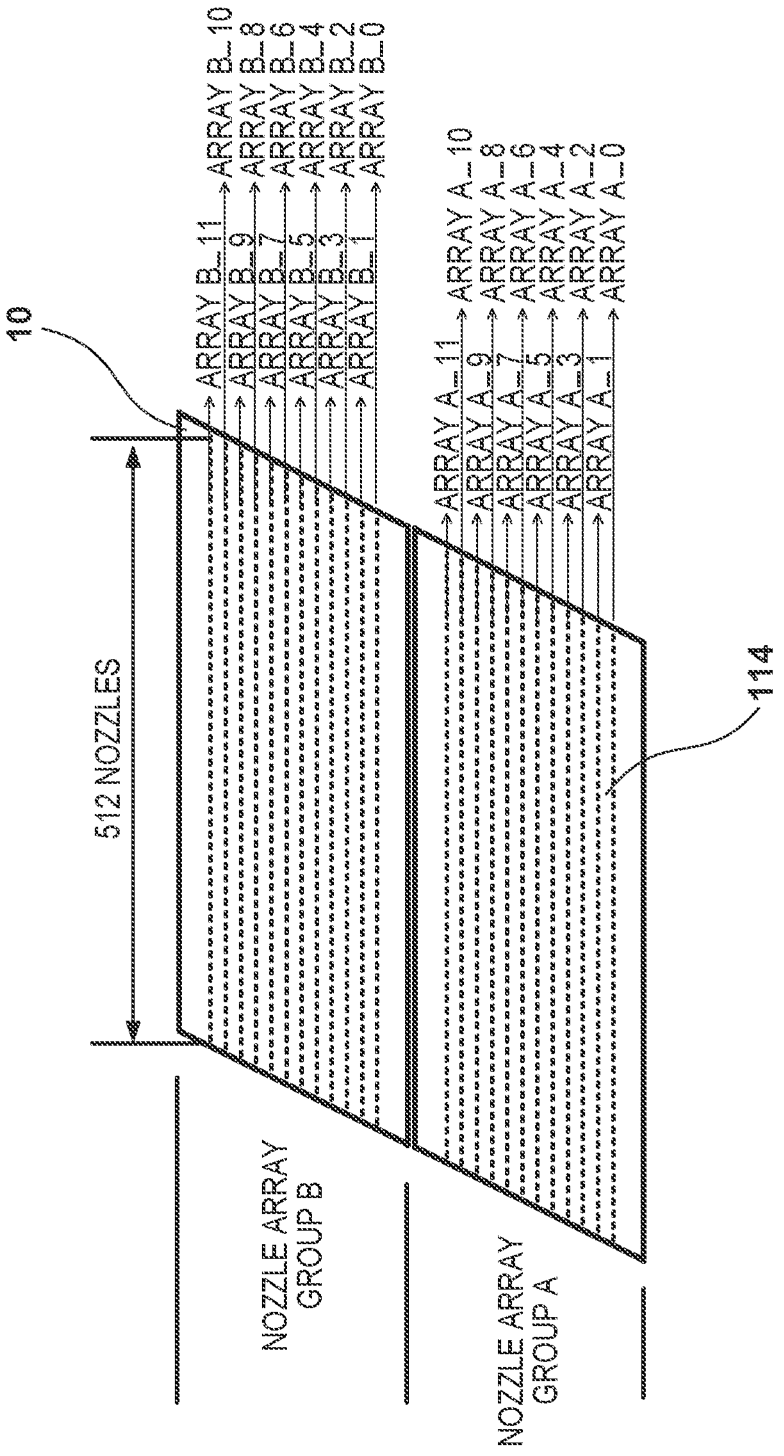
FIG. 10 is a view showing the detailed arrangement of two head chips connected in a direction intersecting a nozzle array direction.

FIG. 10 is a view showing the detailed arrangement of the two head chips (head substrates) connected in the direction intersecting the nozzle array direction.

As shown in FIG. 10, one head chip includes a plurality (12) of nozzle arrays 114, and the 12 nozzle arrays are arranged so that their nozzle array directions are directions intersecting the conveyance direction (the rotation direction of the transfer member) of the print medium. In each nozzle array, 512 nozzles are formed at a pitch of 600 dpi. With respect to adjacent nozzle arrays, nozzles are formed while being shifted by ¼ pitch. Therefore, in adjacent four nozzle arrays, nozzles with a resolution of 2,400 dpi are arranged.

The nozzle arrangement in which the two head chips are connected forms six pairs of nozzle arrays at a resolution of 2,400 dpi.

A heater that applies heat energy to ink and a temperature sensor that measures the temperature of the heater are provided in each nozzle. Each head substrate has a multilayer structure, and a corresponding temperature sensor is provided immediately below each heater in a layer different from that in which each heater is provided. Therefore, a drive pulse can be input to each heater of each head chip forming the printhead, a change in temperature of each heater can be monitored based on an output from the temperature sensor corresponding to each heater, and thus the discharge state of each nozzle can be determined based on the change characteristic. More specifically, the discharge state is determined by detecting, at the time of normal discharge, the change characteristic of a change in temperature caused when the satellite of an ink droplet discharged from a heater surface drops to cool the heater surface.

On the other hand, in terms of electrical connection, in the nozzle arrangement shown in FIG. 10, the nozzles belonging to the upper 12 nozzle arrays and the nozzles belonging to the lower 12 nozzle arrays are connected to electrically isolated, different circuits in order to suppress the influence of noise. The connected circuit is the printing control unit 15A. In this embodiment, the printing control unit 15A is formed from two circuits having the same arrangement. This will be described in detail later.

As shown in FIG. 10, the lower 12 nozzle arrays are called nozzle array group A, and the upper 12 nozzle arrays are called nozzle array group B. The nozzle arrays belonging to nozzle array group A are distinguished as A_0, A_1, . . . , A_11, and the nozzle arrays belonging to nozzle array group B are distinguished as B_0, B_1, . . . , B_11.

An arrangement of inspecting the discharge state of each nozzle of the printhead 30 in the printing system having the above-described arrangement will be described next.

Explanation of Arrangement of Inspecting Discharge State of Nozzle of Printhead (FIGS. 11 to 18C)

The transfer member 2 is provided with an image forming area where an image is formed by discharging inks from the printheads and a discharge inspection area, different from the image forming area, where the ink discharge state of each printhead is inspected by discharging ink.

Figure 11:
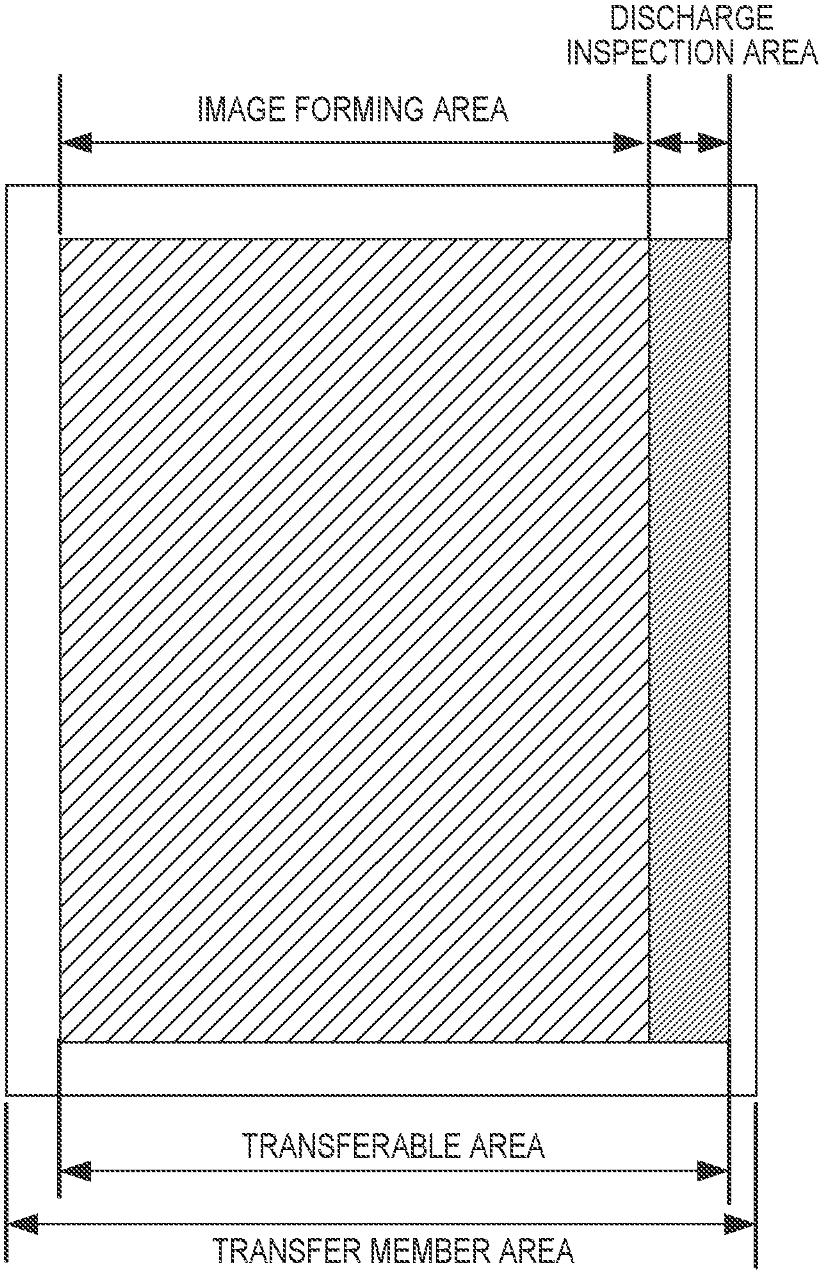
FIG. 11 is a view showing the relationship between an image forming area and a discharge inspection area, both of which are provided in a transfer member.

FIG. 11 is a view showing the relationship between the image forming area and the discharge inspection area, both of which are provided on the transfer member.

If the transfer area of the cylindrical transfer member 2 is extended two-dimensionally, it is represented as a transfer member area, as shown in FIG. 11. In the transfer member area, a transferable area where transfer to the print medium is possible is provided. Furthermore, most of the transferable area is the image forming area, and the discharge inspection area is provided adjacent to the image forming area.

In the discharge inspection area, an inspection pattern is printed based on predetermined inspection data. On the other hand, in the image forming area, an image is formed on the transfer member 2 by discharging, based on the print data, color inks assigned to the eight printheads, among the nine printheads 30, located on the upstream side with respect to the rotation direction of the transfer member 2. Furthermore, the image already formed on the transfer member is covered by discharging the transfer accelerator from the remaining one printhead, that is, the printhead located on the most downstream side with respect to the rotation direction of the transfer member 2. In this way, transfer of the image formed on the transfer member 2 to the print medium P is accelerated, and the amount of ink remaining on the transfer member 2 after transfer is reduced.

After such image forming process, each of the heaters of the nine printheads 30 is driven to discharge ink or the transfer accelerator to the discharge inspection area, and the discharge state of each nozzle is determined based on a change in temperature of each heater detected by each temperature sensor.

In the printhead 30 of type that inspects the discharge state using the above-described temperature sensor, when driving the heater of each nozzle, different drive pulses are used for an image forming process and discharge state inspection. When printing an actual image area, the time during which a droplet floats is advantageously shortened since the droplet can be accurately adhered at a target position. Therefore, a drive pulse is applied so as to increase the kinetic energy of ink. On the other hand, in an inspection mode, since the principle of cooling the heater surface when the satellite of an ink droplet drops, as described above, is used, the kinetic energy of ink is decreased to facilitate a drop of the satellite on the heater surface.

Figure 12:
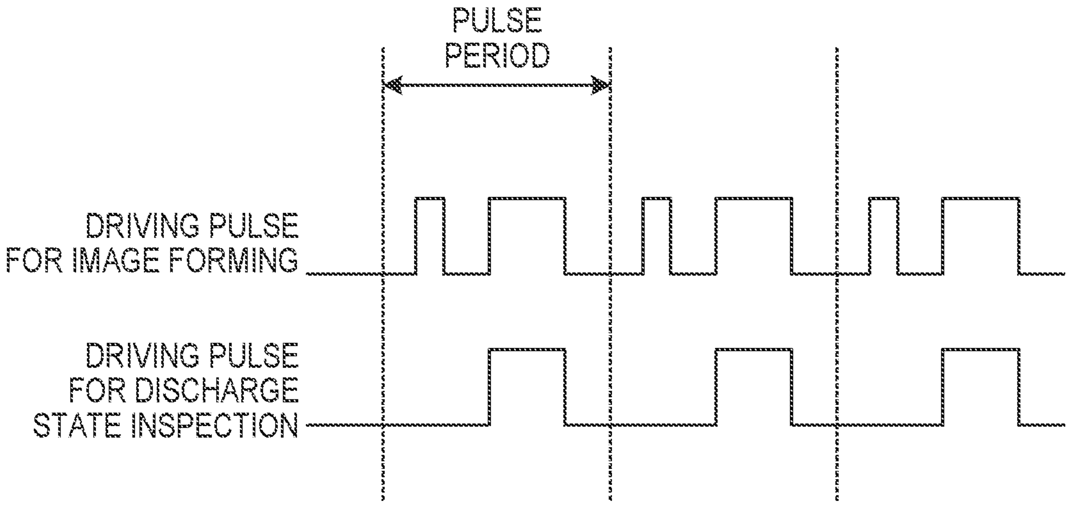
FIG. 12 is a timing chart showing the arrangements of a drive pulse for image formation and a drive pulse for discharge state inspection.

FIG. 12 is a timing chart showing the arrangements of the drive pulse for image formation and the drive pulse for discharge state inspection.

As shown in FIG. 12, when discharging ink to the image forming area of the transfer member 2, the drive pulse for image formation with a double-pulse arrangement is input to each printhead. On the other hand, when discharging ink or the transfer accelerator to the discharge inspection area of the transfer member 2, the drive pulse for discharge inspection with a single-pulse arrangement is input to each printhead.

Figure 13:
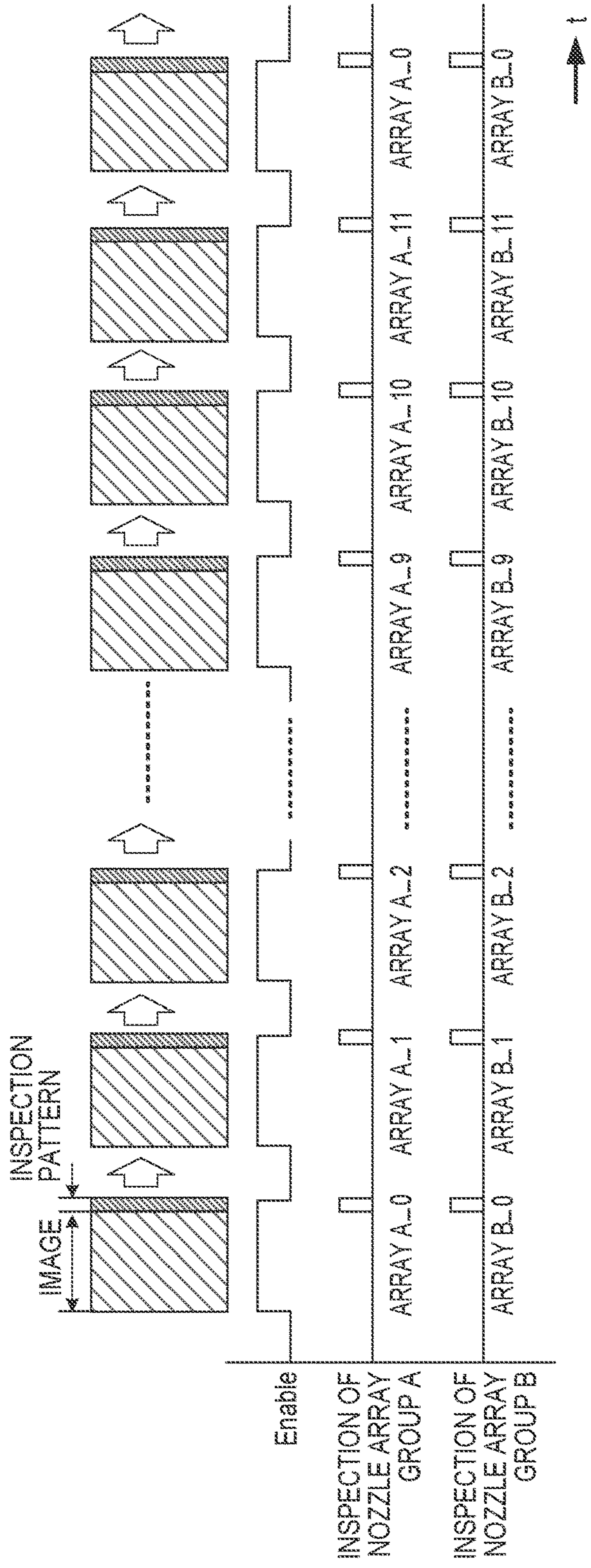
FIG. 13 is a timing chart showing a process of inspecting the discharge state of each nozzle of each printhead that discharges color ink.

FIG. 13 is a timing chart showing a process of inspecting the discharge state of each nozzle of each printhead that discharges color ink.

Since the drive pulse is input to an inspection target heater when executing discharge inspection, the inspection target heater generates heat. Thus, to reduce the influence of the generated heat on the adjacent heater and the influence of noise generated along with driving of the heater, no drive pulse is input to the heaters except for the inspection target heater.

However, in order to prevent ink associated with the inspection pattern from remaining on the transfer member by transferring the inspection pattern formed on the transfer member to the print medium P, the transfer accelerator is discharged from the printhead located on the most downstream side with respect to the rotation direction of the transfer member.

In the head chip arrangement shown in FIG. 10, two head chips are joined and connected in the direction intersecting the nozzle array direction. These two head chips are respectively connected to the two electrically isolated circuits of the same arrangement included in the printing control unit 15A. Therefore, since nozzle array groups A and B are electrically independent of each other, there is no influence of discharge of one nozzle array group, and thus nozzle array groups A and B can undergo concurrent inspection. In this case, color ink discharged from a nozzle of nozzle array group A is covered with the transfer accelerator discharged from a nozzle of nozzle array group B of the head chip of the printhead that discharges the transfer accelerator. Furthermore, color ink discharged from a nozzle of nozzle array group B is covered with the transfer accelerator discharged from a nozzle of nozzle array group A of the head chip of the printhead that discharges the transfer accelerator.

Referring to FIG. 13, if an enable signal (Enable) is turned on, and the drive pulse shown in FIG. 12 is input to each printhead to drive each heater, in the printhead that discharges color ink, one array (512 nozzles) of each of nozzle array groups A and B is inspected. That is, an ink discharge operation on one inspection area prints the inspection pattern. At this time, the corresponding temperature sensor monitors a change in temperature of the heater of the inspection target nozzle, thereby discriminating the discharge state of each nozzle.

In the head chip arrangement shown in FIG. 10, each head chip includes 12 nozzle arrays. Thus, as shown in FIG. 13, by performing discharging inspection 12 times for arrays A_0/B_0 to A_11/B_11, inspection of all the nozzles can be completed.

In the printing apparatus according to this embodiment, each of the nine fixed printheads 30 discharges the ink/transfer accelerator to the rotating transfer member 2. Therefore, in accordance with the rotation of the transfer member, a discharge position by each printhead changes from the image forming area to the discharge inspection area. On the other hand, in the head chip arrangement shown in FIGS. 9 and 10, in accordance with the rotation of the transfer member, the nozzle arrays enter from the image forming area to the discharge inspection subsequently from a nozzle array of nozzle array group A.

Figure 14B:
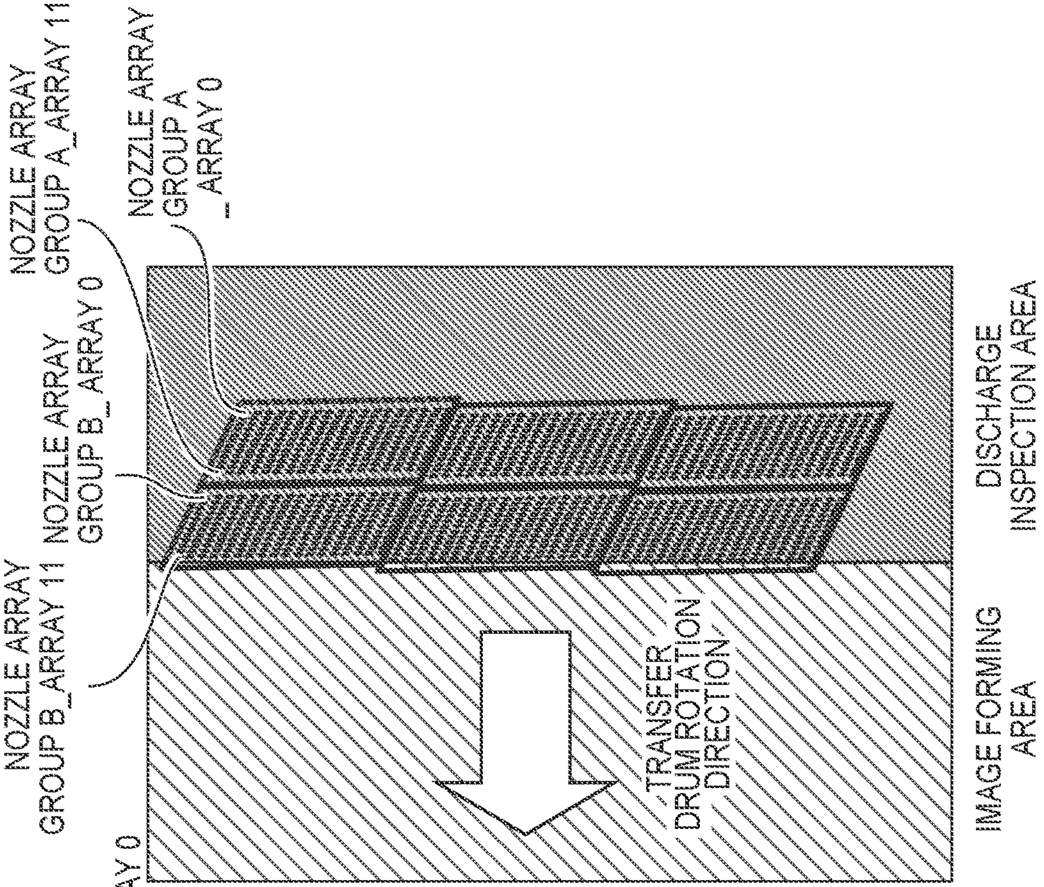
FIGS. 14A and 14B are views each showing the relative positional relationship among a nozzle array group of the head chips according to rotation of the transfer member, the image forming area, and the discharge inspection area.
Figure 14A:
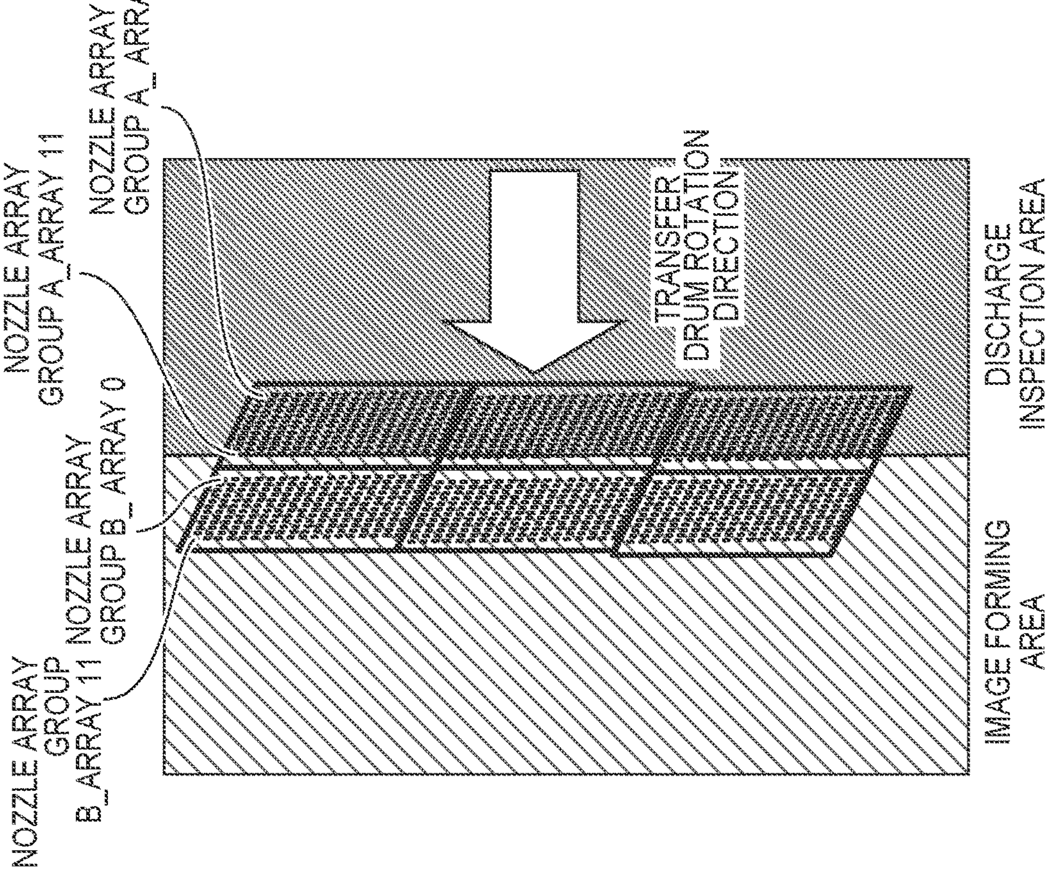

FIGS. 14A and 14B are views showing the relative positional relationship among the nozzle array groups of the head chips according to the rotation of the transfer member, the image forming area, and the discharge inspection area.

FIG. 14A is a view showing a state in which the 11th nozzle array of nozzle array group A exits from the image forming area to enter the discharge inspection area. At this timing, discharge inspection of nozzle array group A starts, and discharge inspection of array 0 starts. On the other hand, FIG. 14B is a view showing a state in which the 11th array of nozzle array group B exits from the image forming area to enter the discharge inspection area. At this timing, discharge inspection of nozzle array group B starts, and discharge inspection of array 0 starts.

As described above, by controlling the discharge inspection timing, the discharge state can be inspected at higher speed.

Figure 15A:
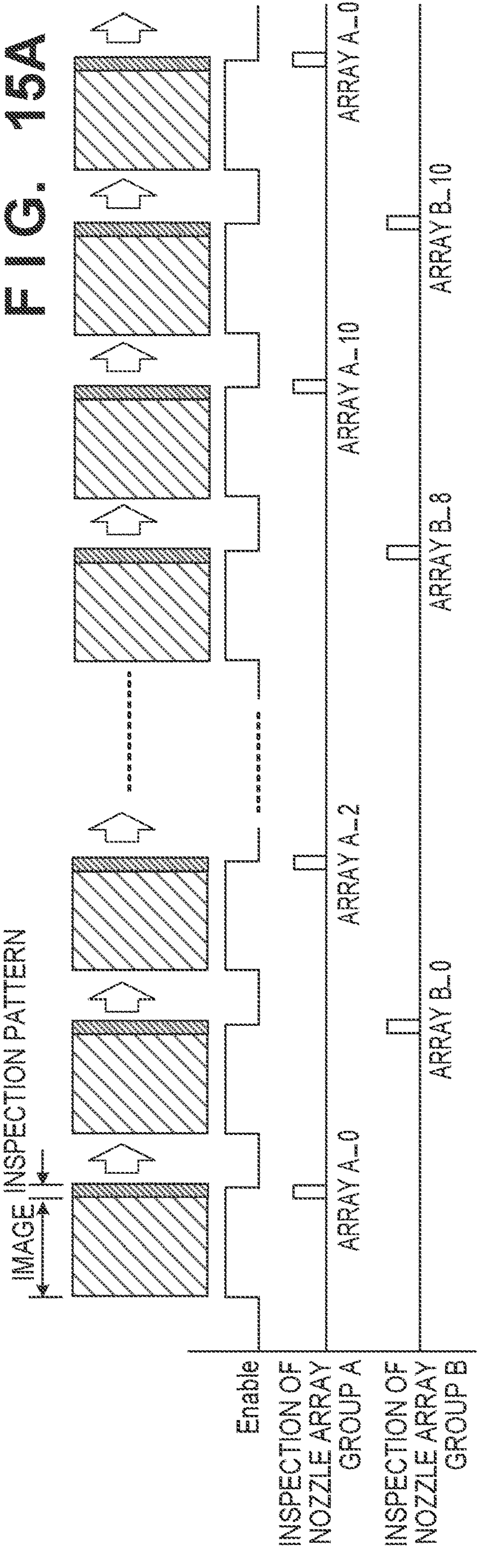
FIGS. 15A and 15B are timing charts each showing a process of inspecting the discharge state of each nozzle of a printhead that discharges a colorless transfer accelerator.
Figure 15B:
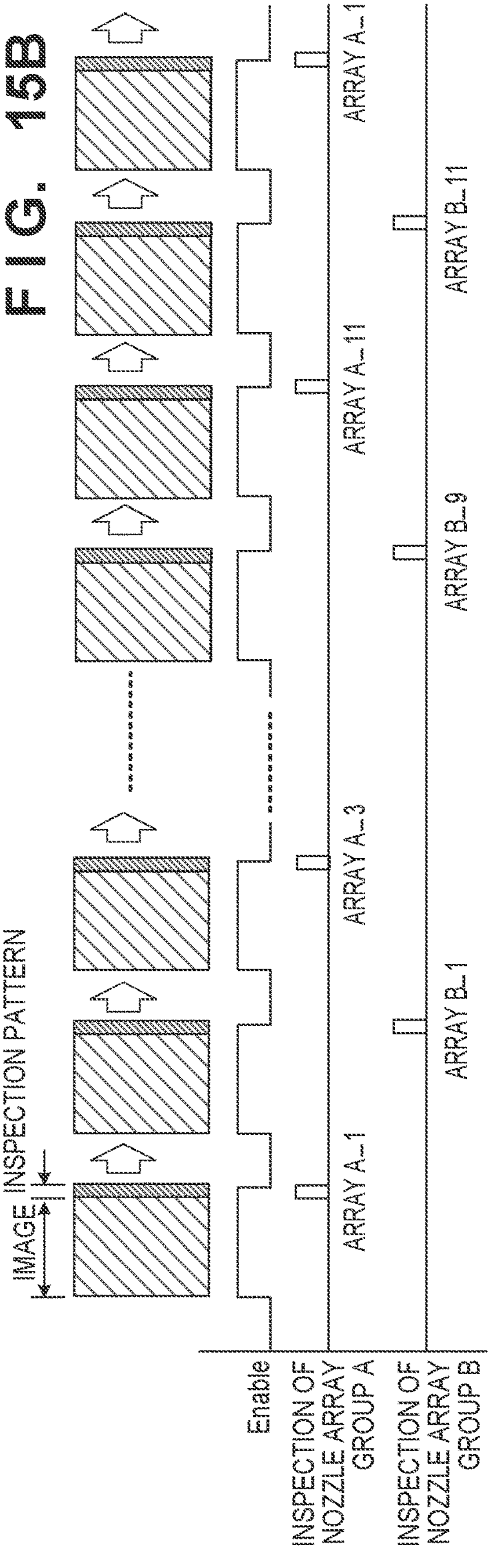

FIGS. 15A and 15B are timing charts each showing a process of inspecting the discharge state of each nozzle of the printhead that discharges the colorless transfer accelerator.

When inspecting the discharge state of each nozzle of the printhead that discharges the transfer accelerator, nozzles belonging to even number arrays (even arrays) or nozzles belonging to odd number arrays (odd arrays) are inspected, instead of inspecting all the nozzles.

FIG. 15A is a timing chart when the nozzles belonging to the even number arrays (even arrays, that is, six arrays) are inspected. FIG. 15B is a timing chart when the nozzles belonging to the odd number arrays (odd arrays, that is, six arrays) are inspected.

In either case, in inspection of each nozzle that discharges the transfer accelerator, one array (512 nozzles) of nozzle array group A or B is inspected in one inspection area. At this time, the corresponding temperature sensor monitors a change in temperature of the heater of the inspection target nozzle, thereby discriminating the discharge state of each nozzle.

Referring to FIGS. 15A and 15B, inspection printing for six arrays (even arrays or odd arrays) of the nozzle array group are performed by alternately using inspection target nozzles included in nozzle array group A and those included in nozzle array group B. Therefore, as shown in FIGS. 15A and 15B, it is possible to complete inspection of all the target nozzles by 12 discharge inspection operations.

Note that in this embodiment, even arrays and odd arrays used as inspection targets are switched for each print job.

Note that in nozzle discharge inspection in which the transfer accelerator is discharged, it is unnecessary to only print the first inspection pattern in the inspection area using nozzles for one array of nozzle array group A. At the discharge inspection timings shown in FIGS. 14A and 14B, nozzle array group B is located in the image forming area, and it is thus possible to cover dots formed by color ink by discharging the transfer accelerator using nozzles for six arrays. As described above, since nozzle array groups A and B are driven by the different circuits, such driving control is possible. Similarly, if the first inspection pattern is printed in the inspection area using nozzles for one array of nozzle array group B, it is possible to cover dots formed by color ink by discharging the transfer accelerator using nozzles for six arrays of nozzle array group A.

Figure 16A:
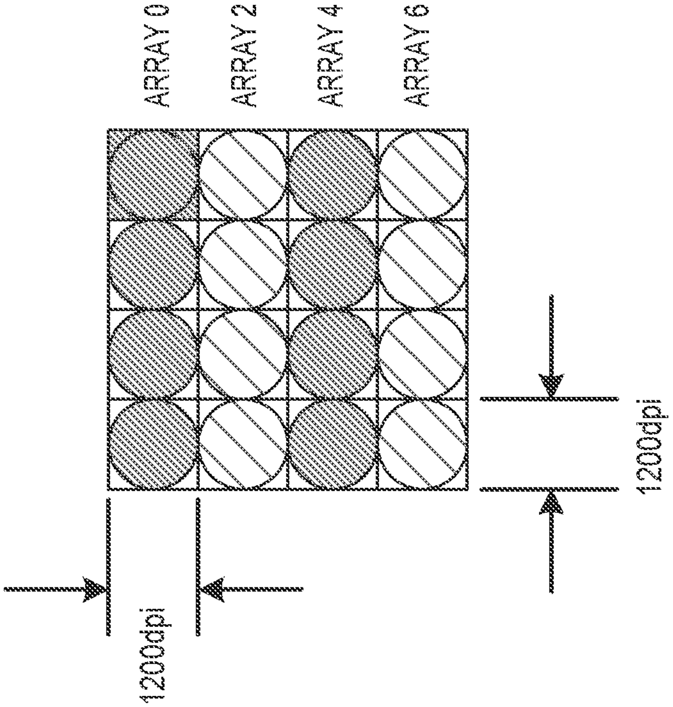
FIGS. 16A and 16B are views showing a difference in area occupied by dots formed on the transfer member caused by a difference in number of nozzle arrays used.
Figure 16B:
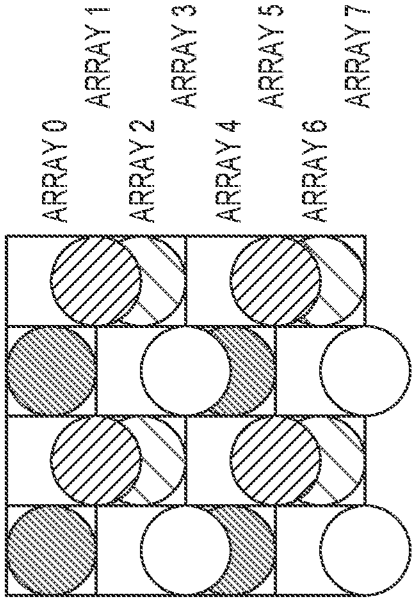

FIGS. 16A and 16B are views showing a difference in occupied area of dots formed on the transfer member caused by a difference in number of nozzle arrays used.

As described above, the nozzles of each nozzle array of each head chip forming the printhead are formed at a pitch of 600 dpi, and the nozzles of adjacent nozzle arrays are formed while being shifted by ¼ pitch in the nozzle array direction, thereby making it possible to perform printing with 2,400 dpi. Therefore, if discharge is performed using the nozzles of even number nozzle arrays, for example, array 0/array 2/array 4/array 6, a dot resolution is 1,200 dpi, and dots are formed and can be arranged uniformly without any gap, as shown in FIG. 16A. To the contrary, if discharge is performed using the nozzles of arrays 0 to 7, a dot resolution is 2,400 dpi, and dots are formed, as shown in FIG. 16B. In this way, if dots the number of which is equal to that in FIG. 16A are discharged, a gap where there is no dot is generated partially for a grid of a resolution of 1,200 dpi.

As described above, to cover dots formed by color ink appropriately and guarantee the transferability of the dots to the print medium, the transfer accelerator is discharged with a resolution of 1,200 dpi using the nozzles of the even number nozzle arrays or the odd number nozzle arrays, as shown in FIG. 16A.

Therefore, inspection of the nozzle discharge state of the printhead that discharges the transfer accelerator is executed for the nozzles of the even number nozzle arrays or the odd number nozzle arrays which are not used to cover the dots formed by color ink.

To the contrary, if a natural picture or the like is printed by discharging the color inks, density unevenness and the like can be reduced by the multipath effect obtained when more nozzles are used, and all the nozzle arrays are used, as shown in FIG. 16B, to minimize the density unevenness generated at the time of a dot landing position shift.

In addition, if inspection for one nozzle array (512 nozzles) that discharges color ink or the transfer accelerator is performed, the 512 heaters corresponding to the nozzles are time-divisionally driven. In this embodiment, the 512 heaters for each nozzle array of each head chip are time-divided into eight blocks and driven. Therefore, inspection of one nozzle array is completed by time-divisional driving for 512/8=64 columns. In each block driving operation, a specific heater to be driven is predetermined, and the discrete nozzles are simultaneously driven in each block to minimize the influence of heat generated by heater driving.

Figure 17:
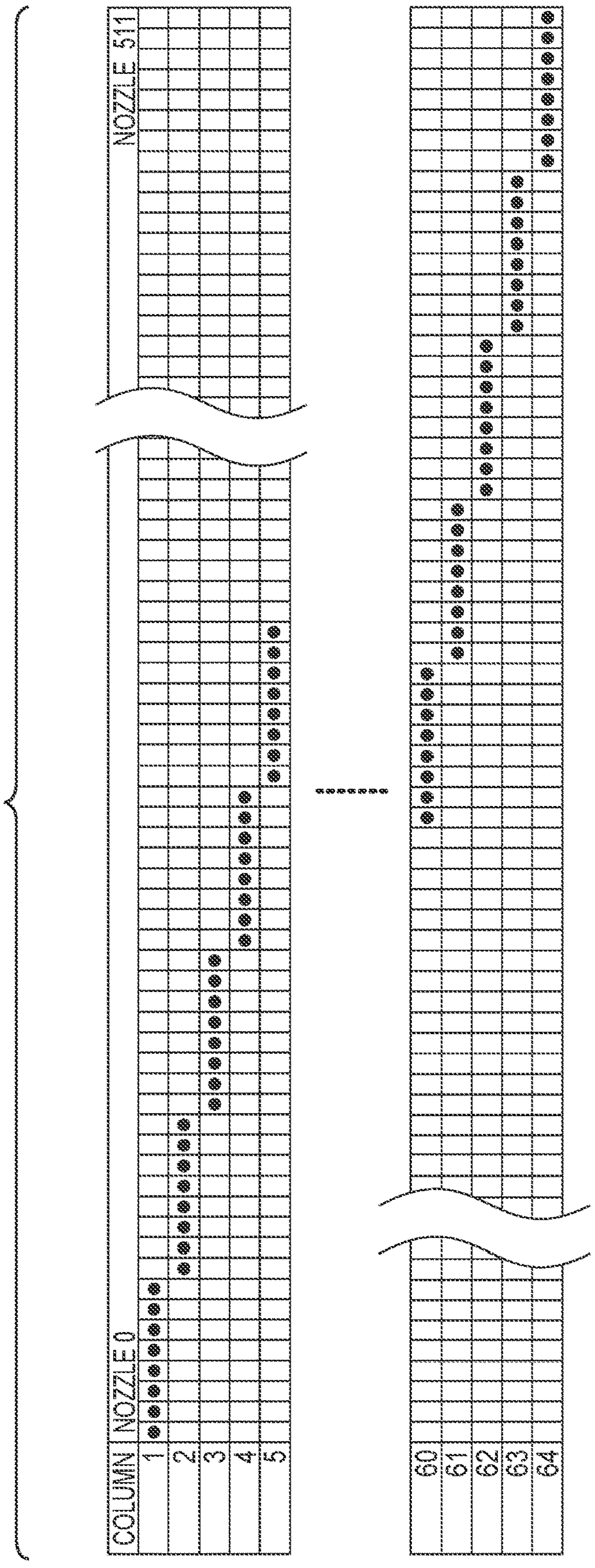
FIG. 17 is a view showing the dot arrangement on the transfer member when dots are formed by time-divisionally driving the nozzles to discharge the transfer accelerator.

FIG. 17 is a view showing the dot arrangement on the transfer member when dots are formed with a resolution of 1,200 dpi by time-divisionally driving the nozzles to discharge the transfer accelerator.

As is apparent from FIG. 17, dots for one nozzle array (512 nozzles) are formed in 64 columns.

Finally, discharge inspection processing executed by the firmware of the printing control unit 15A will be described with reference to flowcharts. Upon detecting an interruption, the firmware prepares settings of inspecting the next nozzle array during image formation in the image area.

Figure 18A:
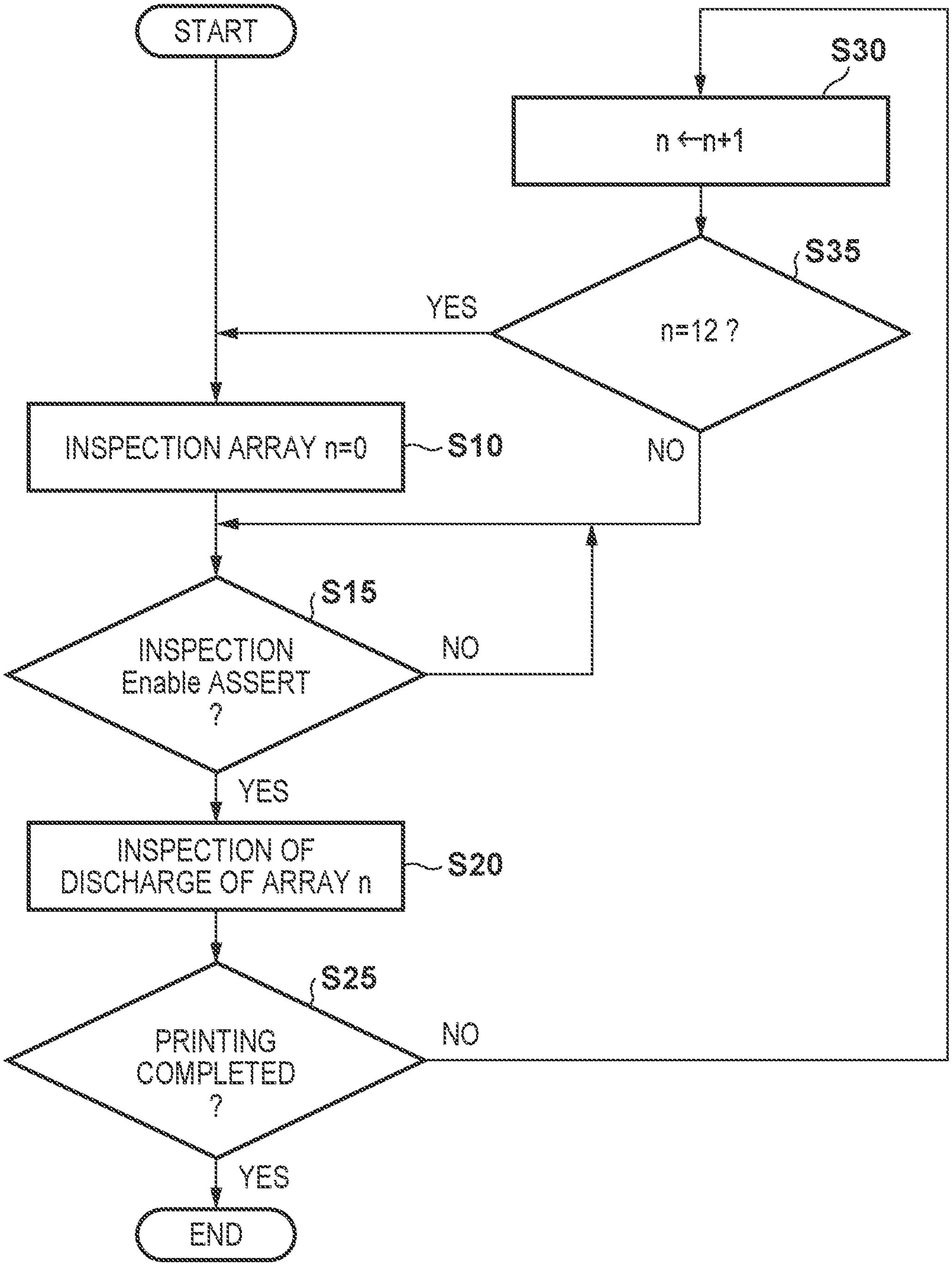
FIGS. 18A, 18B, and 18C are flowcharts each illustrating discharge inspection processing.
Figure 18B:
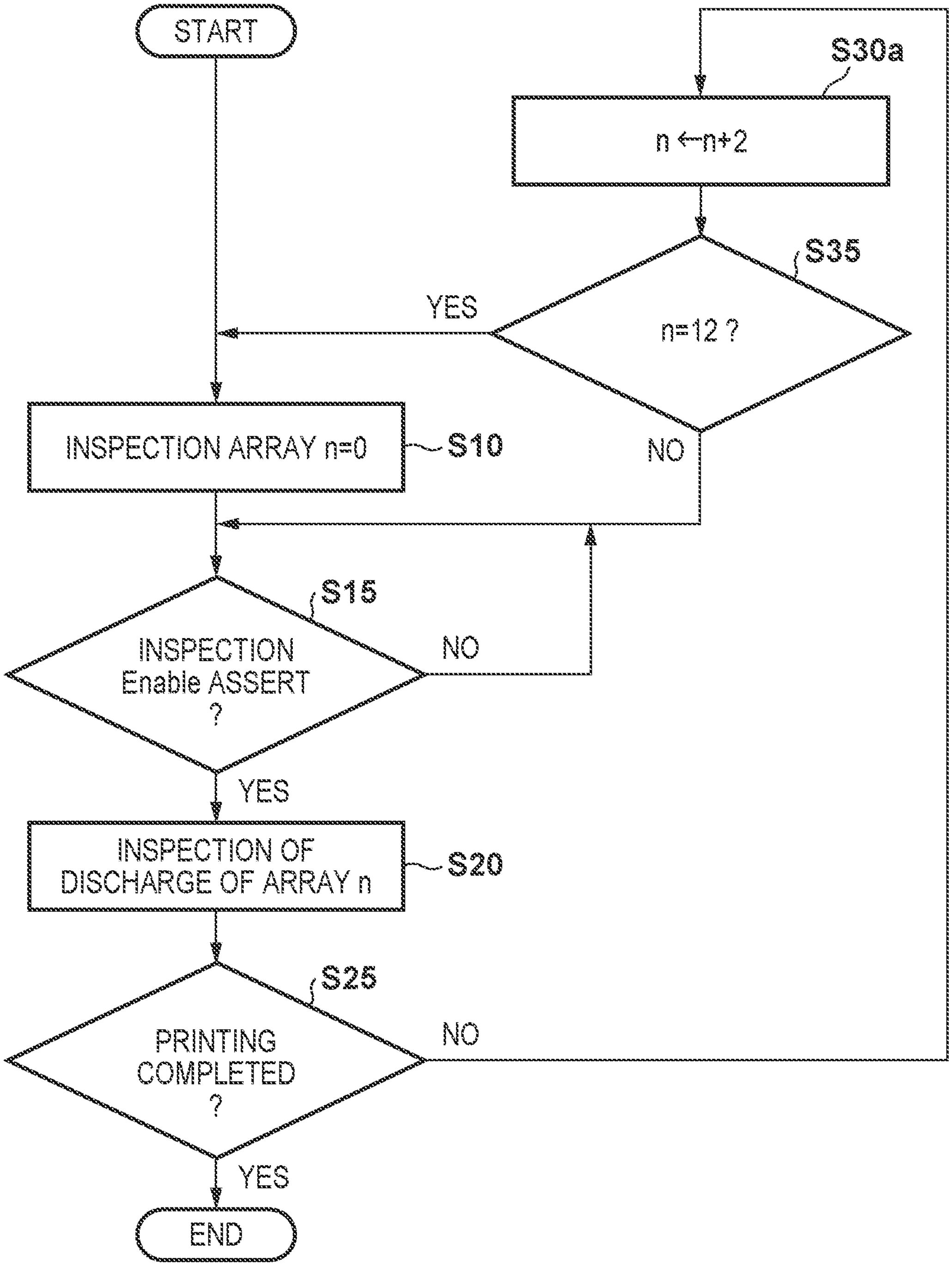
Figure 18C:
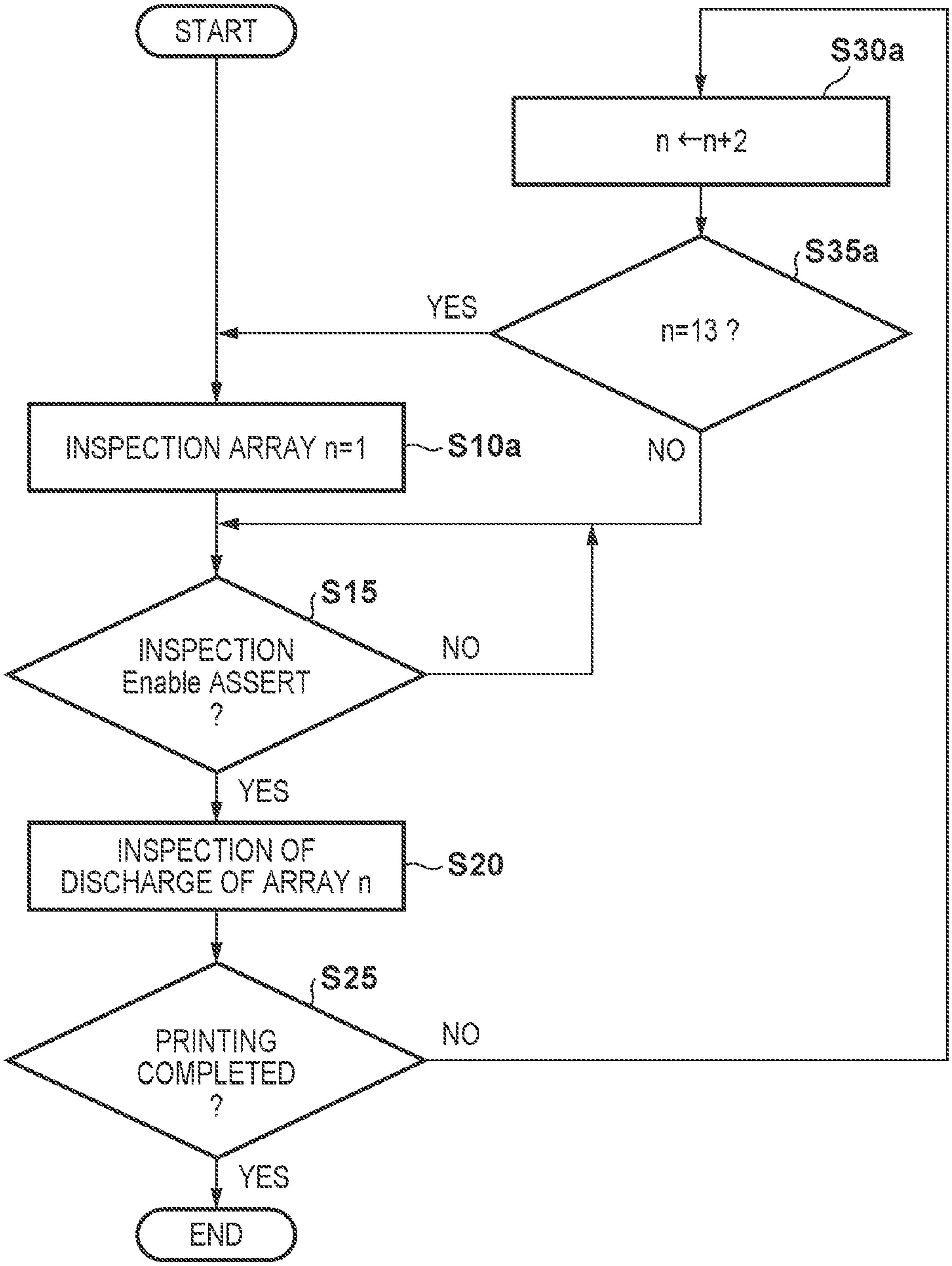

FIGS. 18A to 18C are flowcharts each illustrating discharge inspection processing.

FIG. 18A shows discharge inspection processing of the nozzles that discharge color ink. FIG. 18B shows discharge inspection processing of the nozzles of the even arrays that discharge the transfer accelerator. FIG. 18C shows discharge inspection processing of the nozzles of the odd arrays that discharge the transfer accelerator. Note that in these flowcharts, the same reference symbols denote the same processing steps and a repetitive description thereof will be omitted.

Referring to FIG. 18A, when executing discharge inspection processing of the nozzles of each printhead that discharges color ink, a parameter n for designating an inspection target nozzle array is set as n=0 in step S10. In step S15, it is checked whether an inspection enable signal serving as an inspection execution instruction is asserted. If it is confirmed that the inspection enable signal is asserted, the process executes discharge inspection of each nozzle of inspection target array n in step S20.

In step S25, it is checked whether printing ends. If printing does not end, the process advances to step S30 and the parameter n for designating the inspection target nozzle array is incremented by +1 to designate the next inspection target nozzle array. Then, in step S35, it is checked whether the value of the parameter is 12. As described above, one head chip used in this embodiment is formed from 12 nozzle arrays. Thus, if $n<12$, the process advances to step S15. If $n=12$, the value of the parameter n is reset to 0 to inspect nozzle array 0 again.

If it is determined in step S25 that printing ends, discharge inspection of the nozzles also ends.

As described above, arrays 0 to 11 of each head chip of each printhead that discharges color ink are sequentially inspected.

Referring to FIG. 18B, when executing discharge inspection processing of the nozzles of the even arrays of the printhead that discharges the transfer accelerator, the same processing as that shown in FIG. 18A is basically executed.

However, in the head chip including the 12 nozzle arrays forming the printhead that discharges the transfer accelerator, only six nozzle arrays of even numbers are inspection target nozzle arrays. Therefore, in step S30*a* in which processing of incrementing the parameter n for designating the inspection target nozzle array is performed, an increment value is +2, and processing of n←n+2 is executed.

With this processing, in the printhead that discharges the colorless transfer accelerator, each head chip is inspected every other array like arrays 0, 2, 4, 6, 8, and 10.

Similarly, referring to FIG. 18C, when executing discharge inspection processing of the nozzles of the odd arrays of the printhead that discharges the transfer accelerator, the same processing as that shown in FIG. 18A is basically executed. However, in the head chip including the 12 nozzle arrays forming the printhead that discharges the transfer accelerator, only six nozzle arrays of odd numbers are inspection target nozzle arrays. Therefore, in step S30*a* in which processing of incrementing the parameter n for designating the inspection target nozzle array is performed, an increment value is +2, and processing of n←n+2 is executed. Furthermore, in step S35*a*, it is checked whether the value of the parameter n for designating the inspection target nozzle array is 13.

With this processing, in the printhead that discharges the colorless transfer accelerator, each head chip is inspected every other array like arrays 1, 3, 5, 7, 9, and 11.

The end of inspection for one nozzle array is recognized in accordance with an interruption by negation of the inspection enable signal, and the determination result of the nozzle discharge state is stored in the memory of the storage unit 132.

With the above processing, with respect to a nozzle whose discharge state is determined as a failure, complementary printing is performed using a neighboring nozzle whose discharge state is satisfactory. If the number of nozzles whose discharge state is determined as a failure exceeds a predetermined number, a message for prompting the user to replace the corresponding printhead is displayed on the display of the operation unit 133, and information corresponding to the message is transmitted to the host apparatus HC1.

Therefore, according to the above-described embodiment, inspection of the nozzle discharge state of the printhead that discharges the transfer accelerator can be selectively executed using the control characteristic that the transfer accelerator is not discharged using all the nozzles of the printhead. This makes it possible to inspect the discharge state of each nozzle under more appropriate conditions, thereby obtaining a more accurate determination result. Furthermore, it is possible to accelerate transfer of the inspection pattern formed on the transfer member 2 to the print medium P for inspection, and reduce the amount of ink remaining on the transfer member 2 after transfer, thereby reducing the load of the cleaning unit 5D.

Other Embodiment

In the above embodiment, the print unit 3 includes the plurality of printheads 30. However, a print unit 3 may include one printhead 30. The printhead 30 may not be a full-line head but may be of a serial type that forms an ink image while scanning the printhead 30 in a Y direction.

A conveyance mechanism of the print medium P may adopt another method such as a method of clipping and conveying the print medium P by the pair of rollers. In the method of conveying the print medium P by the pair of rollers or the like, a roll sheet may be used as the print medium P, and a printed product P' may be formed by cutting the roll sheet after transfer.

In the above embodiment, the transfer member 2 is provided on the outer peripheral surface of the transfer drum 41. However, another method such as a method of forming a transfer member 2 into an endless swath and running it cyclically may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-148717, filed Aug. 7, 2018, which is hereby incorporated by reference herein in its entirety.

What is claimed is:

1. A printing apparatus comprising:

a first printhead provided with a first nozzle and a first sensor element corresponding to the first nozzle, and configured to form an image by discharging first ink including coloring material from the first nozzle;

a second nozzle through which second ink is discharged so as to form an image, the second ink having a color different from a color of the first ink;

an inspection unit configured to inspect a discharge state with respect to the first nozzle based on a condition of the first printhead, according to a sensing result of the first sensor element, in a discharge operation for the first ink from the first nozzle; and a control unit configured to control discharging of the first ink from the first nozzle in inspection by the inspection unit and discharging of the second ink from the second nozzle such that the first ink and the second ink overlap each other in the inspection by the inspection unit.

2. The apparatus according to claim 1, further comprising a transfer unit configured to transfer ink from a transfer member to a print medium, wherein the first ink from the first nozzle is discharged to the transfer member, and the second ink from the second nozzle is discharged to the transfer member.

3. The apparatus according to claim 1, wherein the first print head includes a heater corresponding to the first nozzle and configured to apply heat energy to the first ink, the first sensor element is a temperature sensor configured to detect a temperature of the heater, the heater and the temperature sensor are integrated in a head substrate having a multilayer structure, and the temperature sensor is provided immediately below the heater in a layer different from a layer in which the heater is provided.

4. The apparatus according to claim 3, wherein the inspection unit includes a determination unit configured to determine the discharge state of the first nozzle based on a change in temperature of the heater detected by the temperature sensor.

5. The apparatus according to claim 4, further comprising a complementary unit configured to, if a nozzle determined, by the determination unit, to be satisfactory exists near the first nozzle determined as failed, complementally discharge ink by the nozzle determined to be satisfactory.

6. The apparatus according to claim 1, wherein the first print head includes a plurality of a nozzle arrays which are arrayed in a predetermined direction, each nozzle array includes a first nozzle, and when inspecting the discharge state of the first printhead, the inspection unit executes inspection for the plurality of the nozzle arrays by switching an inspection target nozzle array.

7. The apparatus according to claim 1, wherein the first printhead comprises a full-line printhead having a print width corresponding to a width of a print medium in a predetermined direction which intersects a conveyance direction of the print medium being printed.

8. The apparatus according to claim 1, wherein the control unit controls discharging the first ink to a print medium from the first nozzle in the inspection by the inspection unit and discharging the second ink to the print medium from the second nozzle such that the first ink and the second ink overlap each other.

9. The apparatus according to claim 1, wherein the control unit controls discharging the first ink to a print medium from the first nozzle in the inspection by the inspection unit and discharging the second ink to the print medium from the second nozzle such that the second ink overlaps on the first ink.

10. The apparatus according to claim 9, wherein the second ink is colorless ink.

11. The apparatus according to claim 9, wherein the second ink is clear ink.

12. The apparatus according to claim 1, wherein the second ink is colorless ink.

13. The apparatus according to claim 1, wherein the second ink is clear ink.

14. The apparatus according to claim 1, further comprising a second printhead provided with the second nozzle and a second sensor element corresponding to the second nozzle and configured to form an image by discharging the second ink on a print medium from the second nozzle.

15. The apparatus according to claim 1, wherein the first printhead includes a piezoelectric element corresponding to the first nozzle.

16. A method for a printing apparatus including a first printhead provided with a first nozzle and a first sensor element corresponding to the first nozzle, and configured to form an image by discharging first ink including coloring material from the first nozzle, and a second nozzle through which second ink is discharged so as to form an image, the second ink having a color different from a color of the first ink, the method comprising:

inspecting a discharge state with respect to the first nozzle based on a condition of the first printhead, according to a sensing result of the first sensor element, in a discharge operation for the first ink from the first nozzle; and controlling discharging of the first ink from the first nozzle in the inspecting and discharging of the second ink from the second nozzle such that the first ink and the second ink overlap each other in the inspecting.

17. The method according to claim 16, wherein the printing apparatus includes a transfer unit configured to transfer ink from a transfer member to a print medium, wherein the first ink from the first nozzle is discharged to the transfer member, and the second ink from the second nozzle is discharged to the transfer member.

18. The method according to claim 16, wherein the first print head includes a heater corresponding to the first nozzle and configured to apply heat energy to the first ink, the first sensor element is a temperature sensor configured to detect a temperature of the heater, the heater and the temperature sensor are integrated in a head substrate having a multilayer structure, and the temperature sensor is provided immediately below the heater in a layer different from a layer in which the heater is provided.

19. The method according to claim 18, wherein the inspecting includes determining the discharge state of the first nozzle based on a change in temperature of the heater detected by the temperature sensor.

20. The method according to claim 19, further comprising complementally discharging ink, if a nozzle determined in the determining to be satisfactory exists near the first nozzle determined as failed, by the nozzle determined to be satisfactory.

21. The method according to claim 16, wherein the first print head includes a plurality of a nozzle arrays which are arrayed in a predetermined direction, each nozzle array includes a first nozzle, and in the inspecting, inspection for the plurality of the nozzle arrays is executed by switching an inspection target nozzle array.

22. The method according to claim 16, wherein the first printhead comprises a full-line printhead having a print width corresponding to a width of a print medium in a predetermined direction which intersects a conveyance direction of the print medium being printed.

23. The method according to claim 16, wherein in the controlling, discharging the first ink to a print medium from the first nozzle in the inspection by the inspection unit and discharging the second ink to the print medium from the second nozzle are controlled such that the first ink and the second ink overlap each other.

24. The method according to claim 16, wherein in the controlling, discharging the first ink to a print medium from the first nozzle in the inspection by the inspection unit and discharging the second ink to the print medium from the second nozzle are controlled such that the second ink overlaps on the first ink.

25. The method according to claim 24, wherein the second ink is colorless ink.

26. The method according to claim 24, wherein the second ink is clear ink.

27. The method according to claim 16, wherein the second ink is colorless ink.

28. The method according to claim 16, wherein the second ink is clear ink.

29. The method according to claim 16, wherein the printing apparatus includes a second printhead provided with the second nozzle and a second sensor element corresponding to the second nozzle and configured to form an image by discharging the second ink from the second nozzle.

30. The method according to claim 16, wherein the first printhead includes a piezoelectric element corresponding to the first nozzle.

* * * * *